United States Patent
Xu et al.

(10) Patent No.: US 9,986,524 B2
(45) Date of Patent: *May 29, 2018

(54) SMALL CELL DEMODULATION REFERENCE SIGNAL AND INITIAL SYNCHORNIZATION

(71) Applicant: BlackBerry Limited, Waterloo (CA)

(72) Inventors: Hua Xu, Ottawa (CA); Shiwei Gao, Nepean (CA); Zhijun Cai, Ashburn, VA (US); Chandra Sekhar Bontu, Nepean (CA); Yi Song, Plano, TX (US); Yajun Zhu, Beijing (CN)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/376,046

(22) Filed: Dec. 12, 2016

(65) Prior Publication Data

US 2017/0094625 A1    Mar. 30, 2017

Related U.S. Application Data

(63) Continuation of application No. 13/767,682, filed on Feb. 14, 2013, now Pat. No. 9,521,637.

(51) Int. Cl.
*H04W 56/00* (2009.01)
*H04W 72/04* (2009.01)
(Continued)

(52) U.S. Cl.
CPC ... *H04W 56/0015* (2013.01); *H04W 72/0446* (2013.01); *H04W 88/02* (2013.01); *H04W 88/08* (2013.01)

(58) Field of Classification Search
CPC ..... H04W 16/02; H04W 16/10; H04W 16/14; H04W 16/32; H04W 24/02; H04W 24/04;
(Continued)

(56) References Cited

U.S. PATENT DOCUMENTS 8,477,742 B2    7/2013 Grilli et al.
8,483,203 B2 *  7/2013 Zhu .......................... H04L 5/003
                                                    370/345
(Continued)

FOREIGN PATENT DOCUMENTS

CN    102395163 A  *  3/2012  .......... H04J 11/0053
CN    102413572 A  *  4/2012  .......... H04L 25/0226
(Continued)

OTHER PUBLICATIONS

Huawei et al., DMRS enhancements for geographically distributed antennas, Aug. 26, 2011, 3GPP, 3GPP TSG RAN WG1 Meeting # 66, Document R1-112051, accessed at http://www.3gpp.org/ftp/tsg_ran/WG1_RL1/TSGR1_66/Docs/R1-112051.zip ( Year: 2011).*

(Continued)

*Primary Examiner* — Michael Thier
*Assistant Examiner* — Eric Nowlin
(74) *Attorney, Agent, or Firm* — Conley Rose, P.C.; J. Robert Brown, Jr.

(57) ABSTRACT

Described herein is a system with a first network element and a second network element. The first network element contains a processor configured to synchronize with the second network element; and maintain synchronization with the second network element. The first network element is a small cell eNB and the second network element is one of the following: a macro cell enhanced node-B (eNB); or a small cell eNB.

17 Claims, 26 Drawing Sheets

(51) Int. Cl.
*H04W 88/02* (2009.01)
*H04W 88/08* (2009.01)

(58) Field of Classification Search
CPC ..... H04W 36/04; H04W 36/08; H04W 56/00;
H04W 56/001; H04W 56/0015; H04W
56/0045; H04W 72/04; H04W 72/0406;
H04W 72/0426; H04W 72/0446; H04W
72/0453; H04W 72/082; H04W 72/1278;
H04W 76/045; H04W 84/045; H04W
52/243; H04W 72/042; H04W 74/085;
H04W 76/021; H04L 1/00; H04L 1/186;
H04L 5/0007; H04L 5/0053; H04L
5/0073; H04L 5/0078; H04L 27/2656;
H04L 27/2662; H04L 27/2692; H04L
1/1861; H04L 5/0035; H04L 5/0005;
H04L 5/001; H04L 5/0023; H04L 5/0048;
H04L 5/0051; H04L 5/0092; H04L
5/0094; H04B 1/7097; H04B 2201/70701;
H04B 2201/70702
See application file for complete search history.

(56) References Cited

U.S. PATENT DOCUMENTS

| | | | | |
|---|---|---|---|---|
| 8,634,362 B2 * | 1/2014 | Montojo | ............. | H04B 7/0452 370/329 |
| 8,730,937 B2 | 5/2014 | Wang et al. | | |
| 8,804,645 B2 * | 8/2014 | Kim | ................. | H04W 72/0413 370/329 |
| 8,824,343 B2 | 9/2014 | Zhu | | |
| 8,824,968 B2 | 9/2014 | Kim et al. | | |
| 8,897,203 B2 * | 11/2014 | Song | ................. | H04L 27/2611 370/315 |
| 8,923,207 B2 * | 12/2014 | Ho | ...................... | H04L 5/0048 370/328 |
| 8,964,705 B2 * | 2/2015 | Xu | ..................... | H04W 72/042 370/336 |
| 9,008,035 B2 * | 4/2015 | Qu | ...................... | H04L 5/0016 370/330 |
| 9,049,730 B2 * | 6/2015 | Vajapeyam | ......... | H04W 72/085 |
| 9,060,321 B2 * | 6/2015 | Ng | ........................ | H04W 56/00 |
| 9,130,719 B2 * | 9/2015 | Kim | .................... | H04L 5/0023 |
| 9,167,585 B2 * | 10/2015 | Sayana | ............. | H04W 72/048 |
| 9,179,396 B2 * | 11/2015 | Wang | .................... | H04W 48/16 |
| 9,191,170 B2 | 11/2015 | Jang et al. | | |
| 9,253,771 B2 * | 2/2016 | Miao | .................. | H04W 72/042 |
| 9,363,777 B2 | 6/2016 | Wu et al. | | |
| 9,369,253 B2 * | 6/2016 | Pourahmadi | ......... | H04L 5/0053 |
| 9,425,946 B2 * | 8/2016 | Pourahmadi | ......... | H04L 5/0007 |
| 9,461,807 B2 * | 10/2016 | Takeda | ................. | H04L 5/0073 |
| 9,497,006 B2 * | 11/2016 | Chung | ................. | H04L 5/0053 |
| 9,521,637 B2 * | 12/2016 | Xu | ..................... | H04W 56/0015 |
| 9,537,678 B2 * | 1/2017 | Lee | ....................... | H04L 25/022 |
| 9,571,248 B2 * | 2/2017 | Yi | ........................... | H04W 72/04 |
| 9,578,671 B2 * | 2/2017 | Blankenship | ....... | H04W 76/025 |
| 9,596,064 B2 * | 3/2017 | Park | ..................... | H04L 5/0053 |
| 9,608,788 B2 * | 3/2017 | Yang | .................... | H04L 5/0091 |
| 9,681,434 B2 * | 6/2017 | Kim | .................... | H04L 5/0051 |
| 9,698,892 B2 * | 7/2017 | Horiuchi | ............ | H04B 7/086 |
| 9,749,144 B2 * | 8/2017 | Xu | ...................... | H04L 12/189 |
| 9,826,546 B2 * | 11/2017 | Li | ......................... | H04L 1/0026 |
| 2007/0217367 A1 | 9/2007 | Lee et al. | | |
| 2009/0270107 A1 | 10/2009 | Lee et al. | | |
| 2010/0110983 A1 | 5/2010 | Fu | | |
| 2010/0189081 A1 | 7/2010 | Zhang et al. | | |
| 2011/0103291 A1 | 5/2011 | Wiberg et al. | | |
| 2011/0158164 A1 | 6/2011 | Palanki et al. | | |
| 2011/0170496 A1 | 7/2011 | Fong et al. | | |
| 2011/0170562 A1 | 7/2011 | Hu et al. | | |
| 2011/0235597 A1 * | 9/2011 | Montojo | ............. | H04B 7/0452 370/329 |
| 2011/0292847 A1 * | 12/2011 | Yoon | .................... | H04L 5/0007 370/280 |
| 2011/0310878 A1 | 12/2011 | Lindoff et al. | | |
| 2011/0312319 A1 | 12/2011 | Lindoff et al. | | |
| 2011/0319025 A1 * | 12/2011 | Siomina | ................. | H04B 7/024 455/63.1 |
| 2012/0044818 A1 | 2/2012 | Lindoff et al. | | |
| 2012/0087442 A1 | 4/2012 | Xu et al. | | |
| 2012/0127948 A1 * | 5/2012 | Chung | .................. | H04L 5/0053 370/329 |
| 2012/0134338 A1 | 5/2012 | Ko et al. | | |
| 2012/0140726 A1 | 6/2012 | Moon et al. | | |
| 2012/0176996 A1 * | 7/2012 | Kim | .................. | H04W 72/0413 370/329 |
| 2012/0188988 A1 | 7/2012 | Chung et al. | | |
| 2012/0224533 A1 | 9/2012 | Lin et al. | | |
| 2012/0236977 A1 | 9/2012 | Zou et al. | | |
| 2012/0309405 A1 * | 12/2012 | Parkvall | ................ | H04W 48/08 455/452.1 |
| 2013/0010668 A1 | 1/2013 | Lin et al. | | |
| 2013/0021991 A1 | 1/2013 | Ko et al. | | |
| 2013/0034070 A1 * | 2/2013 | Seo | ......................... | H04B 7/155 370/329 |
| 2013/0044664 A1 * | 2/2013 | Nory | ..................... | H04L 1/0045 370/311 |
| 2013/0064168 A1 * | 3/2013 | Song | .................. | H04L 27/2613 370/315 |
| 2013/0083769 A1 * | 4/2013 | Qu | ........................ | H04L 5/0016 370/330 |
| 2013/0084865 A1 | 4/2013 | Agrawal et al. | | |
| 2013/0089075 A1 | 4/2013 | Lim | | |
| 2013/0114514 A1 * | 5/2013 | Nissila | ................. | H04L 5/0051 370/329 |
| 2013/0115990 A1 | 5/2013 | Koc et al. | | |
| 2013/0121186 A1 * | 5/2013 | Vajapeyam | ......... | H04W 72/085 370/252 |
| 2013/0242861 A1 | 9/2013 | Abchuyeh et al. | | |
| 2013/0265980 A1 * | 10/2013 | Zhu | ......................... | H04L 1/06 370/329 |
| 2013/0308555 A1 * | 11/2013 | Ho | ......................... | H04L 5/0048 370/329 |
| 2013/0308572 A1 * | 11/2013 | Sayana | ............... | H04W 72/048 370/329 |
| 2013/0322235 A1 | 12/2013 | Khoryaev et al. | | |
| 2014/0140297 A1 | 5/2014 | Son et al. | | |
| 2014/0140315 A1 | 5/2014 | Kim et al. | | |
| 2014/0226541 A1 * | 8/2014 | Xu | ..................... | H04W 56/0015 370/280 |
| 2014/0226575 A1 | 8/2014 | Davydov et al. | | |
| 2014/0226636 A1 * | 8/2014 | Xu | ....................... | H04W 72/042 370/336 |
| 2014/0233407 A1 * | 8/2014 | Pourahmadi | .......... | H04L 5/0007 370/252 |
| 2014/0233466 A1 * | 8/2014 | Pourahmadi | .......... | H04L 5/0051 370/329 |
| 2014/0269632 A1 * | 9/2014 | Blankenship | ....... | H04W 76/025 370/336 |
| 2014/0293900 A1 * | 10/2014 | Takeda | .................. | H04L 5/0073 370/329 |
| 2014/0301288 A1 * | 10/2014 | Koc | ..................... | H04W 76/00 370/329 |
| 2014/0321399 A1 * | 10/2014 | Liu | ..................... | H04W 72/042 370/329 |
| 2014/0321434 A1 | 10/2014 | Gayde et al. | | |
| 2014/0334399 A1 | 11/2014 | Xu et al. | | |
| 2015/0009964 A1 * | 1/2015 | Ellenbeck | ............. | H04W 48/16 370/336 |
| 2015/0049704 A1 * | 2/2015 | Park | ..................... | H04L 5/0048 370/329 |
| 2015/0173033 A1 | 6/2015 | Wu et al. | | |
| 2015/0215085 A1 * | 7/2015 | Xu | ......................... | H04W 4/06 370/312 |
| 2015/0229493 A1 * | 8/2015 | Lee | ..................... | H04L 25/022 370/252 |
| 2015/0256312 A1 * | 9/2015 | Yi | ........................... | H04W 72/04 370/329 |

(56) References Cited

U.S. PATENT DOCUMENTS

| | | | |
|---|---|---|---|
| 2015/0282124 A1* | 10/2015 | Miao | H04W 72/042 455/450 |
| 2015/0305059 A1* | 10/2015 | Li | H04L 1/0026 370/329 |
| 2016/0013906 A1* | 1/2016 | Guo | H04L 5/0048 370/329 |
| 2016/0066290 A1 | 3/2016 | Cohen et al. | |
| 2016/0087709 A1* | 3/2016 | Horiuchi | H04B 7/068 375/260 |
| 2016/0262035 A1* | 9/2016 | Yang | H04L 5/0091 |
| 2016/0262161 A1* | 9/2016 | Li | H04J 11/0023 |
| 2016/0308646 A1* | 10/2016 | Qiao | H04L 5/0023 |
| 2016/0323895 A1* | 11/2016 | Pourahmadi | H04L 5/0007 |
| 2017/0005772 A1* | 1/2017 | Takeda | H04L 5/0073 |
| 2017/0064685 A1* | 3/2017 | Rico Alvarino | H04L 5/0091 |
| 2017/0070865 A1* | 3/2017 | Mazzarese | H04W 72/04 |
| 2017/0102447 A1* | 4/2017 | Choi | G01S 5/0252 |
| 2017/0134130 A1* | 5/2017 | Li | H04L 5/0048 |
| 2017/0149543 A1* | 5/2017 | Ang | H04L 5/0048 |
| 2017/0150486 A1* | 5/2017 | Ang | H04B 7/0452 |
| 2017/0181011 A1* | 6/2017 | Yu | H04L 27/2601 |
| 2017/0272141 A1* | 9/2017 | Horiuchi | H04B 7/068 |
| 2017/0289980 A1* | 10/2017 | Liu | H04W 72/042 |

FOREIGN PATENT DOCUMENTS

| | | | | |
|---|---|---|---|---|
| CN | 103312391 A | * | 9/2013 | |
| CN | 103327628 A | * | 9/2013 | H04B 7/2656 |
| CN | 103428863 A | * | 12/2013 | H04L 5/0048 |
| CN | 103973399 A | * | 8/2014 | H04L 1/0026 |
| CN | 104396305 A | | 3/2015 | |
| CN | 104620512 A | * | 5/2015 | H04B 7/024 |
| CN | 103428863 B | * | 8/2016 | |
| CN | 106572529 A | * | 4/2017 | G01S 5/0252 |
| CN | 102413572 B | * | 6/2017 | H04L 25/0226 |
| EP | 2451226 A1 | | 5/2012 | |
| EP | 2665221 A2 | * | 11/2013 | H04L 5/0048 |
| EP | 2665221 A3 | * | 3/2016 | H04L 5/0048 |
| KR | 20150020529 A | * | 2/2015 | H04L 5/0048 |
| KR | 20170042174 A | * | 4/2017 | G01S 5/0252 |
| WO | WO-2012152004 A1 | * | 11/2012 | H04L 25/0226 |
| WO | WO-2013000253 A1 | * | 1/2013 | H04J 11/0053 |
| WO | WO-2013172670 A1 | * | 11/2013 | H04L 5/0048 |
| WO | 2013185318 A1 | | 12/2013 | |
| WO | WO-2014047785 A1 | * | 4/2014 | H04B 7/024 |

OTHER PUBLICATIONS

Qualcomm Incorporated, Discussion on signaling support for CRS interference handling, May 25, 2012, 3GPP TSG-RAN WG2 #78, Document R2-122848, accessed at http://www.3gpp.org/ftp/tsg_ran/WG2_RL2/TSGR2_78/docs/R2-122848.zip (Year: 2012).*

ZTE, Evaluation on necessity of DMRS enhancement under HetNet CoMP scenarios, Aug. 26, 2011, 3GPP, 3GPP TSG RAN WG1 Meeting #66, Document R1-112263, accessed at http://www.3gpp.org/ftp/tsg_ran/WG1_RL1/TSGR1_66/Docs/R1-112263.zip (Year: 2011).*

Ericsson et al., Potential Enhancements for DMRS in Rel-11, Aug. 26, 2011, 3GPP, 3GPP TSG RAN WG1 Meeting #66, Document R1-112086, accessed at http://www.3gpp.org/ftp/tsg_ran/WG1_RL1/TSGR1_66/Docs/R1-112086.zip (Year: 2011).*

3GPP TSG-RAN Meeting #58; "New Study Item Proposal for Small Cell Enhancements for E-UTRA and E-UTRAN—Physical-layer Aspects"; RP-122032; Barcelona, Spain; Dec. 4-7, 2012; 10 pages.

3GPP TSG RAN WG1 Meeting #69; "CR on Additional Special Configuration"; R1-122894; Prague, CZ; May 21-25, 2012; 9 pages.

3GPP TSG-RAN WG4 Ad Hoc #1; "Text Proposal for TR 36.922: TDD HeNB Synchronization Using Network Listening"; R4-10xxx (R4-100049); Jan. 18-22, 2010; Sophia Antipolis, France; 7 pages.

3GPP TSG-RAN WG4 Meeting #51; "Discussion on Synchronization Requirements for TDD HeNB"; R4-091786; San Francisco, USA; May 4-8, 2009; 4 pages.

Office Action dated Oct. 6, 2014; U.S. Appl. No. 13/767,644, filed Feb. 14, 2013; 20 pages.

Notice of Allowance dated Jan. 7, 2015; U.S. Appl. No. 13/767,644, filed Feb. 14, 2013; 5 pages.

Office Action dated Oct. 24, 2014; U.S. Appl. No. 13/767,682, filed Feb. 14, 2013; 32 pages.

Final Office Action dated Apr. 17, 2015; U.S. Appl. No. 13/767,682, filed Feb. 14, 2013; 33 pages.

Advisory Action dated Jun. 18, 2015; U.S. Appl. No. 13/767,682, filed Feb. 14, 2013; 3 pages.

Office Action dated Jul. 28, 2015; U.S. Appl. No. 13/767,682, filed Feb. 14, 2013; 44 pages.

Office Action dated Jan. 25, 2016; U.S. Appl. No. 13/767,682, filed Feb. 14, 2013; 44 pages.

Notice of Allowance dated Jul. 27, 2016; U.S. Appl. No. 13/767,682, filed Feb. 14, 2013; 10 pages.

PCT International Search Report; Application No. PCT/US2013/026195; dated Oct. 10, 2013; 4 pages.

PCT Written Opinion of the International Searching Authority; Application No. PCT/US2013/026195; dated Oct. 10, 2013; 7 pages.

Canadian Office Action; Application No. 2,900,451; dated Jul. 20, 2016; 4 pages.

PCT International Search Report; Application No. PCT/US2013/026201; dated Nov. 8, 2013; 4 pages.

PCT Written Opinion of the International Searching Authority; Application No. PCT/US2013/026201; dated Nov. 8, 2013; 6 pages.

Canadian Office Action; Application No. 2,900,593; dated Aug. 23, 2016; 3 pages.

Canadian Office Action; Application No. 2,900,451; dated May 15, 2017; 4 pages.

\* cited by examiner ial. entitled, "Design for Small Cell Demodulation Reference Signal and Initial Synchronization", which is incorporated by reference herein as if reproduced in its entirety.

SMALL CELL DEMODULATION REFERENCE SIGNAL AND INITIAL SYNCHORNIZATION

CROSS-REFERENCE TO RELATED APPLICATIONS

This application is a continuation of U.S. patent application Ser. No. 13/767,682 filed Feb. 14, 2013 by Hua Xu, et al. entitled, "Design for Small Cell Demodulation Reference Signal and Initial Synchronization", which is incorporated by reference herein as if reproduced in its entirety.

FIELD OF THE DISCLOSURE

The present disclosure relates to small cell demodulation reference signal (DMRS) and initial synchronization.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the terms "access node" and "network element" may be used interchangeably, but it is understood that an access node may comprise a plurality of hardware and software.

The geographical area of reception and transmission coverage provided by an access node may be referred to herein as a cell. Some cells may have significantly larger coverage area than others and may be referred to herein as macro-cells. Some cells may have significantly smaller coverage area than the macro-cells and may be referred to herein as small cells. Small cells may also include micro-cells, pico-cells, and femto-cells. In some embodiments, small cells may operate within the area covered by a macro-cell.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that Although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

A small cell may exist within the area of coverage provided by a macro-cell. The small cell may transmit to user equipment at a different frequency than the macro-cell. Because small cells typically have low transmit power and thus small coverage area, and serve user equipment with low mobility, the radio channels change slowly in both time and frequency. Therefore, less overhead may be required for transmitting demodulation reference signal (DMRS) which are the reference signals (RS) for data demodulation. DMRS density may be reduced in the frequency or time domain, or both.

In cases where the small cell transmits at the same frequency as the macro-cell, it is important to ensure synchronization between the small cell and the macro-cell in order to enable coordinated multipoint transmission (COMP) and inter-cell interference coordination (ICIC). The small cell may be configured to listen to a sync channel from a macro-cell or another small cell. The small cell may also configure special sub-frames in the downlink channel.

Figure 1:
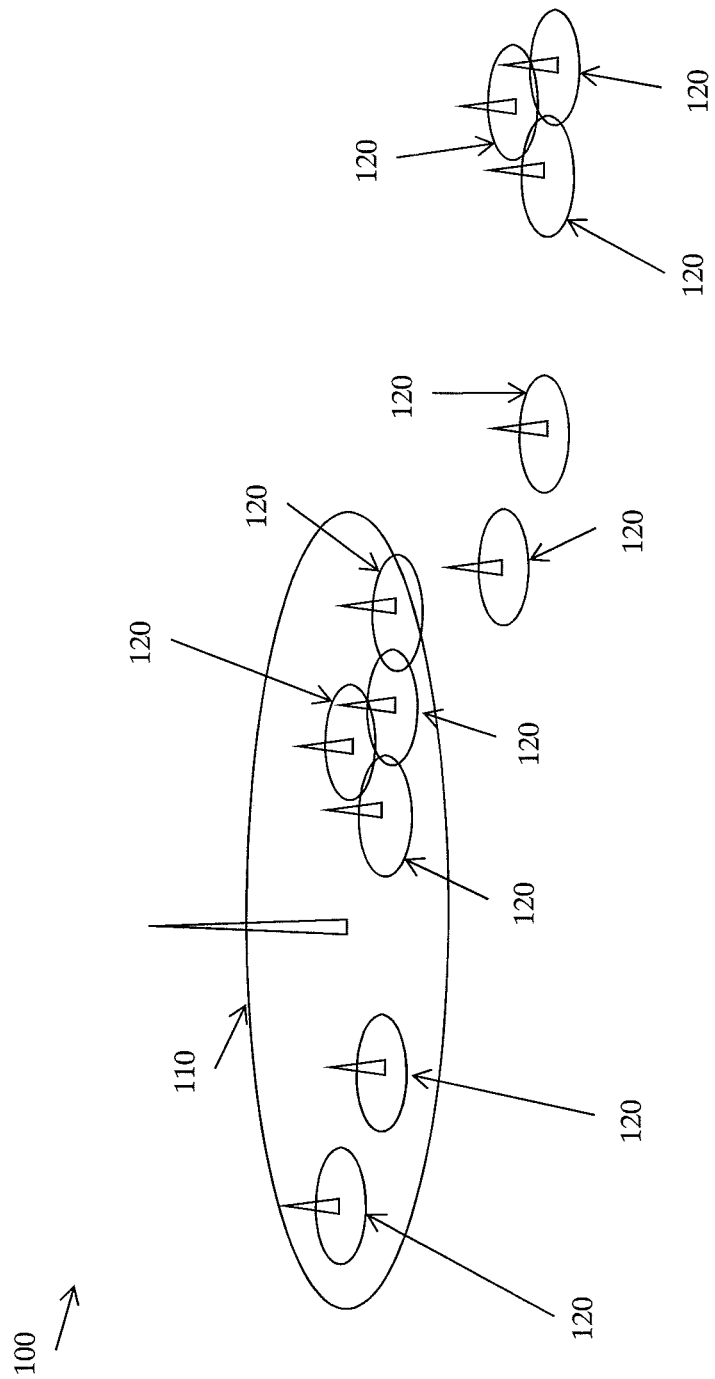
FIG. 1 is a diagram of a portion of a wireless network.

FIG. 1 is a diagram of a portion of a wireless network 100. The portion of the wireless network 100 contains a macro-cell 110 and a plurality of small cells 120. While only one macro-cell 110 is depicted the wireless network may comprise many macro-cells 110 and many small cells 120. The small cells 120 may exist within the coverage area of the macro-cell 110, or the small cells 120 may be deployed outside of the macro-cell 110 coverage area. The small cells 120 may be deployed in both indoor and outdoor scenarios as hot spots or to fill coverage holes of the macro-cell 110. Some of the small cells 120 may overlap in coverage areas. Each small cell 120 and macro-cell 110 may support one or more user equipment (not pictured). Each small cell 120 and macro-cell 110 may be in wireless communication with the user equipment in their respective coverage area. The small cells 120 may be deployed to facilitate offloading of UE traffic from the macro-cell 110. The small cells 120 may also allow for increased data throughput to UEs, and an increased per area throughput.

In some embodiments, the small cells 120 may operate at a different frequency than the macro-cell 110. For example, the small cells 120 may operate at the 3.5 GHz frequency band, while the macro-cell may operate at the 700 MHz frequency band. User Equipment in this embodiment may be configured to communicate using both 700 MHz frequency band and the 3.5 GHz frequency band. The UEs may be served by both the small cells 120 and the macro-cell 110. In some embodiments, the UEs may receive control plane information from the macro-cell 110 and user data plane communications from the small cells 120, or vice-versa.

In some embodiments, the macro-cell 110 and small cells 120 may communicate with supported UEs using the same frequency band. This may be known as co-channel communication. Co-channel communication may be useful when an operator does not have the additional spectrum available to support the small cells on a different frequency band as that for the macro-cell.

In some embodiments, UEs with low mobility may be serviced by small cells, while UEs with a high mobility may be serviced by macro-cells. In certain embodiments where the small cell is servicing lower mobility UEs, the root mean square (RMS) channel delay spread and Doppler spread may both be relatively smaller than UEs serviced in a macro-cell with high mobility, this may result in a relatively flat channel in the frequency domain and less fluctuated channel along the time domain. With a relatively flat channel in the frequency domain and less fluctuated channel along the time domain, it may be possible to reduce the density of reference signals (i.e. DMRS) transmitted by the small cells without causing a significant impact on communication performance of the small cell.

In certain embodiments, DMRS may be configured differently for a small cell in comparison with a macro-cell. For example, DMRS overhead may be reduced by reducing DMRS density along either the time or frequency domain, or both. As another example, orthogonal DMRS assignments may be used for small cells deployed in a cluster. As used herein, orthogonal DMRS may include DMRS that are orthogonal in at least one of the frequency domain, the time domain, the spatial domain, or the code domain. Orthogonal DMRS assignments may require coordination between small cells and may result in reduced interference as well as provide convenience for interference estimation and cancellation for the UEs with an advanced receiver. The DMRS configuration may be signaled explicitly to the UE through dynamic signaling or semi-static signaling or determined implicitly. The eNB may adaptively change the DMRS configuration and configure different DMRS patterns for different UEs serviced by the eNB. In some embodiments, physical resource block (PRB) bundling may be used by the small cell. With PRB bundling, different DMRS patterns may be spread across several PRB pairs. As another example, overlapping small cells may use shifted or complemented DMRS patterns to reduce interference between the small cells.

In certain embodiments, the frequency band used by the small cell may be the same as the frequency band used by the macro-cell, in this case, it may be necessary to synchronize the small cell with the macro-cell. The small cell may listen to a sync-channel from the macro-cell, or another small cell using the same frequency. The small cell may configure a special sub-frame, for example a multimedia broadcast multicast single frequency network (MBSFN) sub-frame or almost blank sub-frame (ABS), and monitor the CRS transmitted in the macro-cell or another small cell which it is synchronized with.

In 3GPP Rel-10, UE-specific DMRS was introduced for physical downlink shared channel (PDSCH) demodulation in transmission mode (TM) 9. 8 DMRS ports are defined for TM 9 where a DMRS port may be an antenna port that carries a DMRS. The DMRS for DMRS ports {7,8,11,13} are code division multiplexed on a set of time frequency resources in a PRB, while DMRS for DMRS ports {9,10,12,14} are code division multiplexed on a different set of time frequency resources in the same PRB. The length four orthogonal covering code (OCC), as defined in Table 1 below, is used on four resource elements (REs) along time domain of the PRB pair to multiplex four DMRS for DMRS ports ({7,8,11,13}, or {9,10,12,14}). Each OCC code (i.e. [ $\overline{w}_p(0)$ $\overline{w}_p(1)$ $\overline{w}_p(2)$ $\overline{w}_p(3)$ ]) may spread on four resource elements in the PRB where index {0,1,2,3} indicates the REs that it is going to spread onto. The OCC codes for DMRS at DMRS ports {7,8,11,13} may be spread on one set of four REs, while OCC codes for DMRS at DMRS ports {9,10,12,14} may be spread on another set of four REs.

TABLE 1

OCC code used for multiplexing DMRS for DMRS ports

| Antenna port p | [$\overline{w}_p(0)$ $\overline{w}_p(1)$ $\overline{w}_p(2)$ $\overline{w}_p(3)$] |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

As used herein. a PRB pair may comprise one-hundred-sixty-eight resource elements (REs). The PRB pair may comprise two PRBs, each PRB comprising eighty-four REs. A RE comprises one Orthogonal Frequency Division Multiplexing (OFDM) symbol in time and one subcarrier in frequency. A subframe may comprise two slots with seven OFDM symbols in each slot. A PRB may comprise REs over one slot in time and 12 subcarriers in frequency. The terms "PRB pair" and "subframe" may be used interchangeably throughout.

Figure 2:
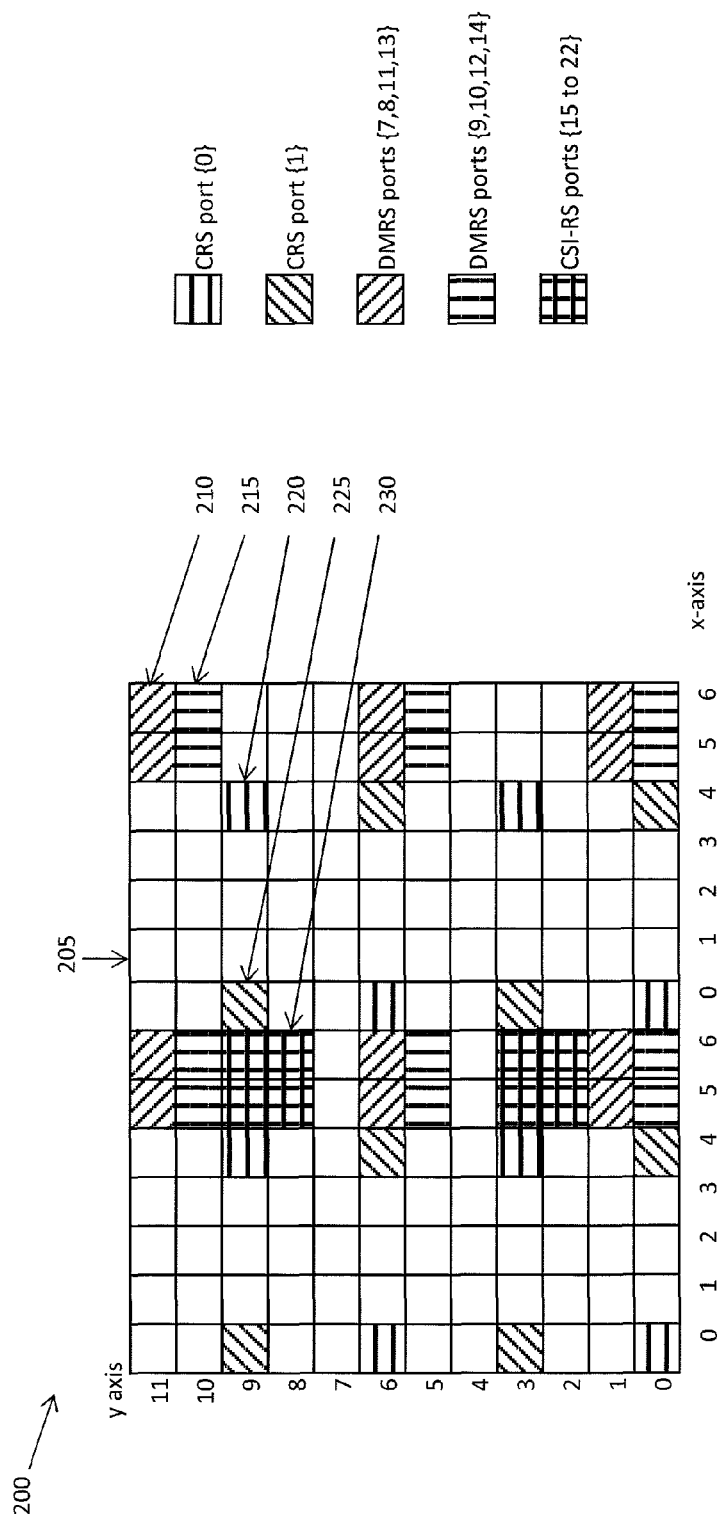
FIG. 2 is diagram of a physical resource block (PRB) pair containing a transmission mode (TM) 9 demodulation reference signal (DMRS) pattern.

FIG. 2 is a diagram of a PRB pair containing a TM 9 DMRS pattern 200. The x-axis may represent the time domain with each column representing a OFDM symbol. The y-axis may represent the frequency domain, with each row representing a subcarrier. In TM9, each DMRS port set, DMRS ports {7,8,11,13} 210 or DMRS ports {9,10,12,14} 215, may require twelve REs 205 in each PRB pair 200 to transmit DMRS signals. Thus, in TM9, each PRB pair 200 may use twenty-four REs 205 for DMRS transmission. Typically, in TM9, a single DMRS port may use 12 REs for each DMRS symbol, and up to 4 DMRS ports may be multiplexed across the 12 REs used for DMRS transmission. In addition, CRS port {0} 220 and CRS port {1} 225, as well as CSI-RS ports {15-22} 230 are also transmitted in the TM 9 PRB pair 200.

Figure 3:
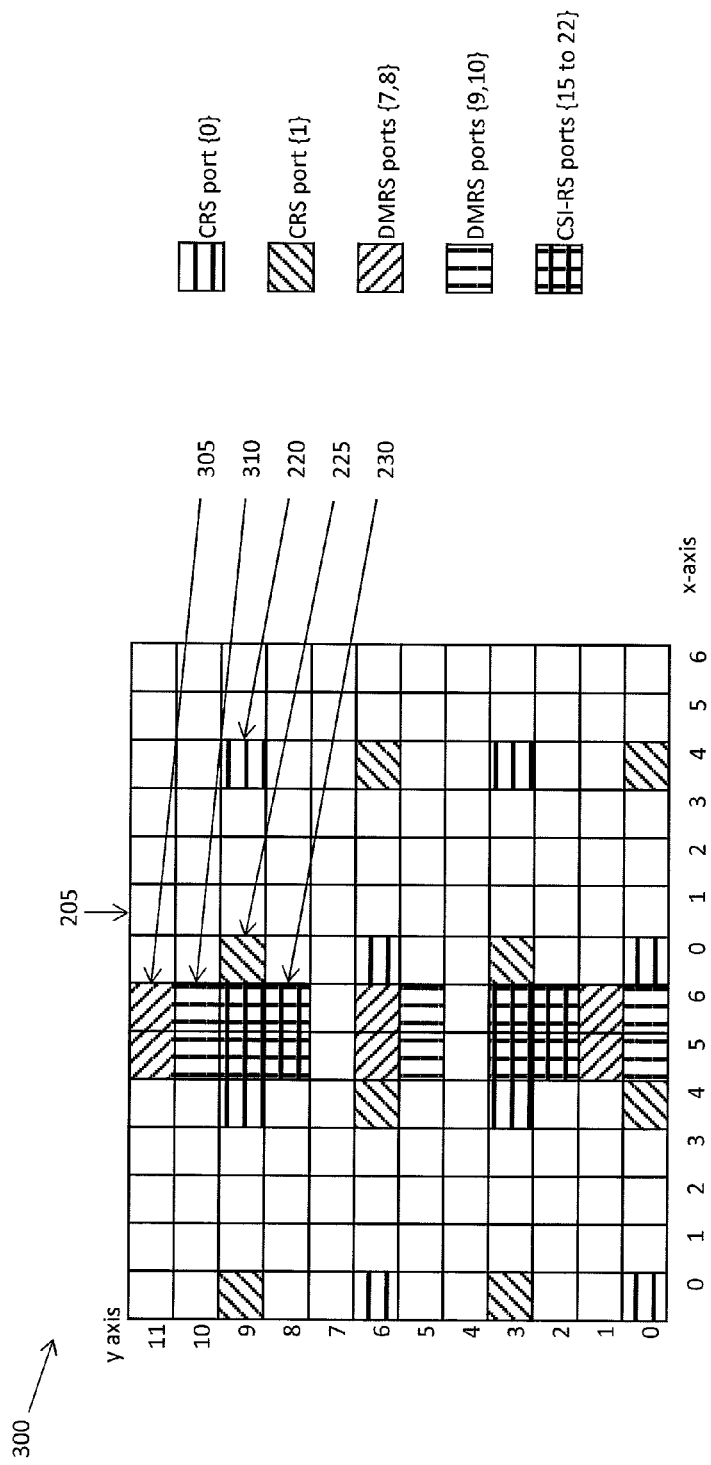
FIG. 3 is a diagram of a PRB pair containing DMRS pattern Alt 1.

FIG. 3 is a diagram of a PRB pair containing DMRS pattern Alt 1 300. To reduce the DMRS overhead, the DMRS of TM 9 DMRS pattern 200 transmitted in the second PRB of the PRB pair may be eliminated. In this Alternative, only the first PRB of the DMRS pattern Alt 1 carries REs 205 for DMRS transmission. DMRS pattern Alt 1 may keep the same DMRS density along the frequency domain as defined in TM9, but with reduced DMRS density in time domain. DMRS pattern Alt 1 may support four DMRS ports, i.e. DMRS ports {7,8} 305 and DMRS ports {9,10} 310, which means four layer MIMO transmission may be supported.

Figure 4:
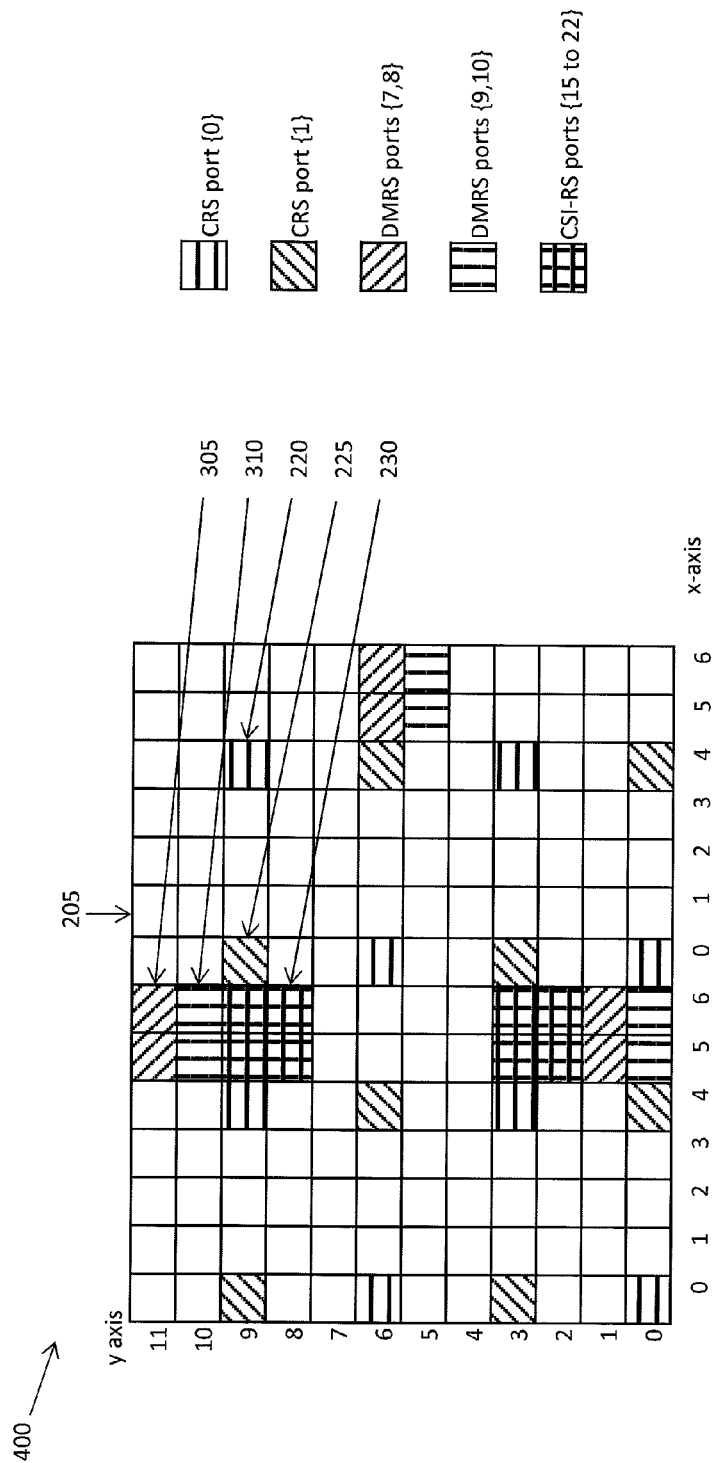
FIG. 4 is a diagram of a PRB pair containing DMRS pattern Alt 2.

FIG. 4 is a diagram of a PRB pair containing DMRS pattern Alt 2 400. The REs 205 that carry DMRS may be split between the first PRB and the second PRB. DMRS pattern Alt 2 may use two pairs of REs 205 in the first PRB, one on each side of the PRB boundary and the middle pair of REs 205 in the second PRB to carry DMRS signals. DMRS pattern Alt 2 may maintain good balance on DMRS transmission along both time and frequency domains. DMRS pattern Alt 2, may support four DMRS ports, i.e. DMRS ports {7,8} 305 and DMRS ports {9,10} 310, which means four layer MIMO transmission may be supported using DMRS pattern Alt 2.

Figure 5:
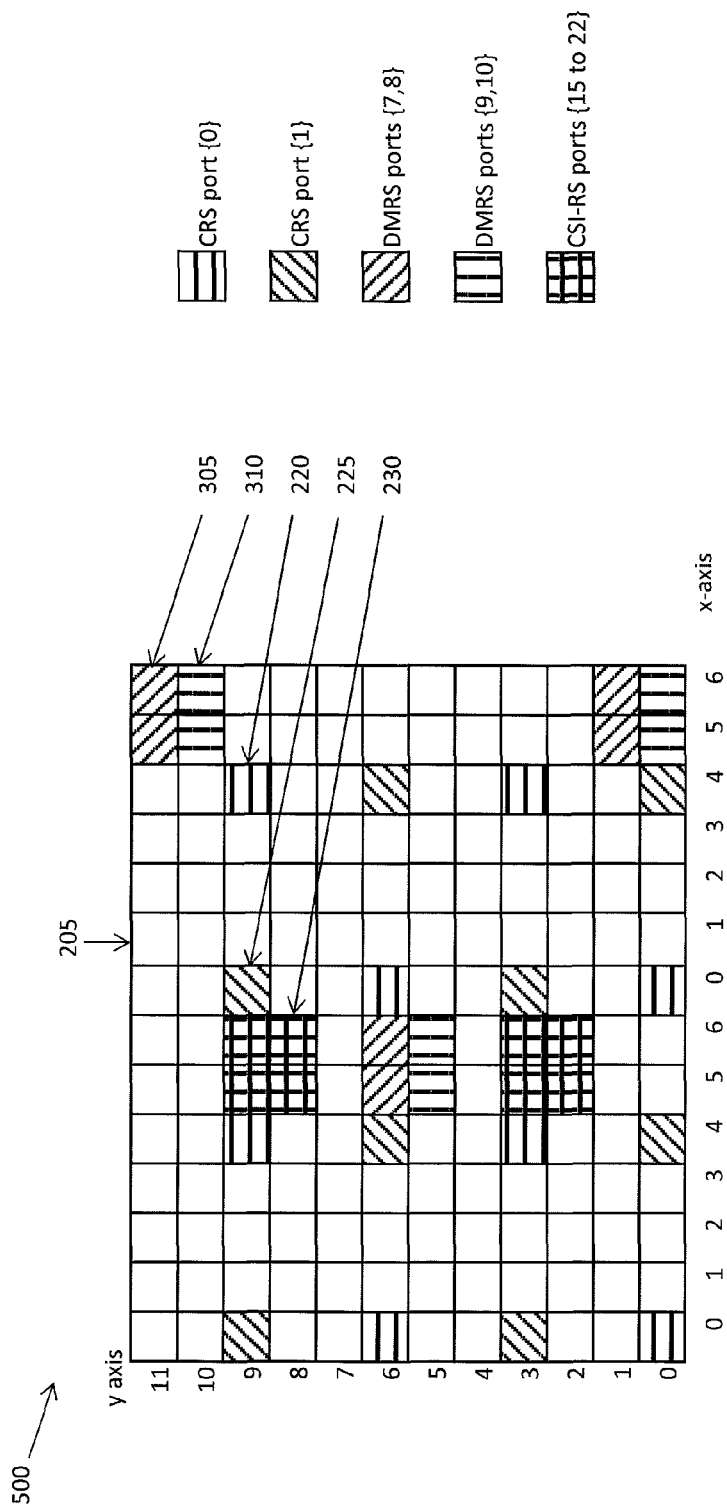
FIG. 5 is a diagram of a PRB pair containing DMRS pattern Alt 3.

FIG. 5 is a diagram of a PRB pair containing DMRS pattern Alt 3 500. DMRS pattern Alt 3 may use the middle pair of REs 205 in the first PRB and two pairs of REs 205, one on each side of the PRB boundary in the second PRB to carry DMRS signals. DMRS pattern Alt 3 may maintain good balance on DMRS transmission along both time and frequency domains. DMRS pattern Alt 3, may support four DMRS ports, i.e. DMRS ports {7,8} 305 and DMRS ports {9,10} 310, which means four layer MIMO transmission may be supported using DMRS pattern Alt 3.

Figure 6:
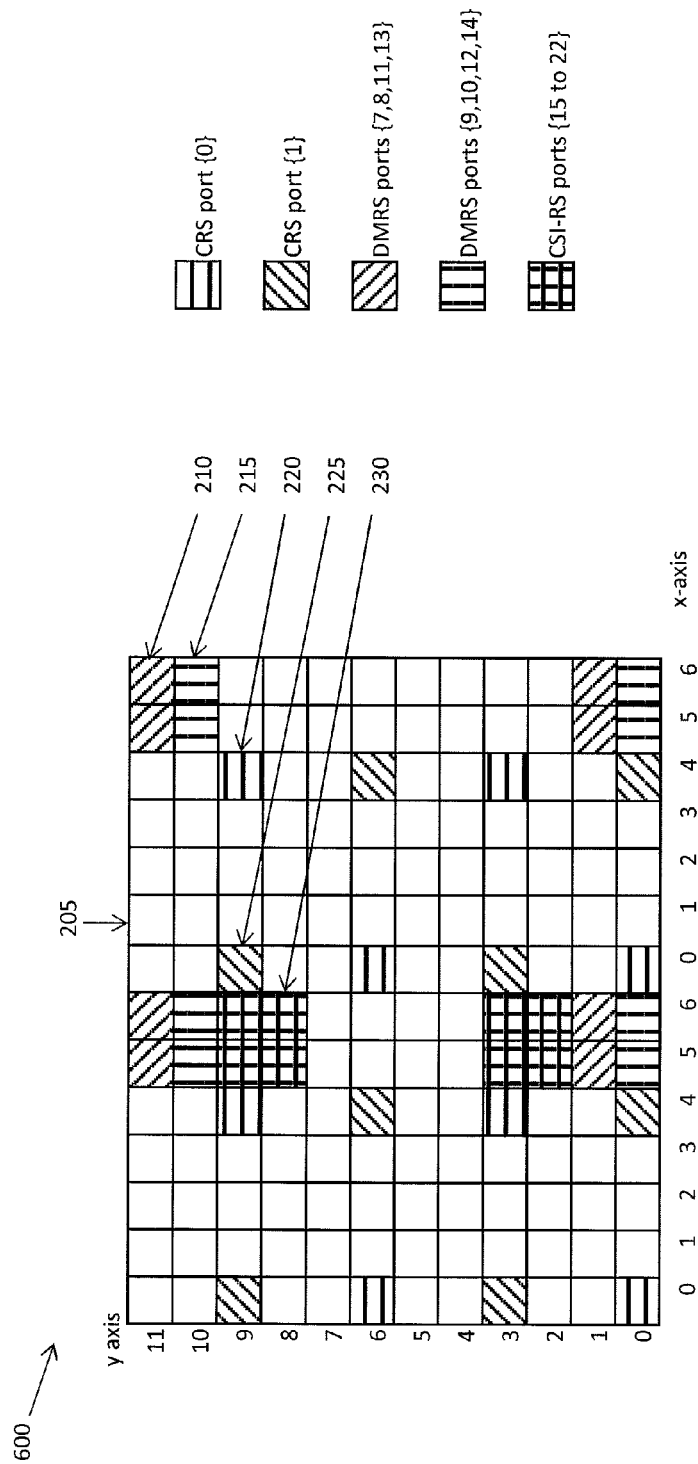
FIG. 6 is a diagram of a PRB pair containing DMRS pattern Alt 4.

FIG. 6 is a diagram of a PRB pair containing DMRS pattern Alt 4 600. DMRS pattern Alt 4 may reduce the number of REs used for DMRS along the frequency domain, but maintain the number of REs used for DMRS along the time domain. Thus, the pairs of REs that carry DMRS along frequency direction are reduced from 3 to 2. DMRS pattern Alt 4, may support eight DMRS ports, i.e. DMRS ports {7,8, 11, 13} 210 and DMRS ports {9,10, 12, 14} 215, which means eight layer MIMO transmission may be supported using DMRS pattern Alt 4, using sixteen REs 205.

Figure 7:
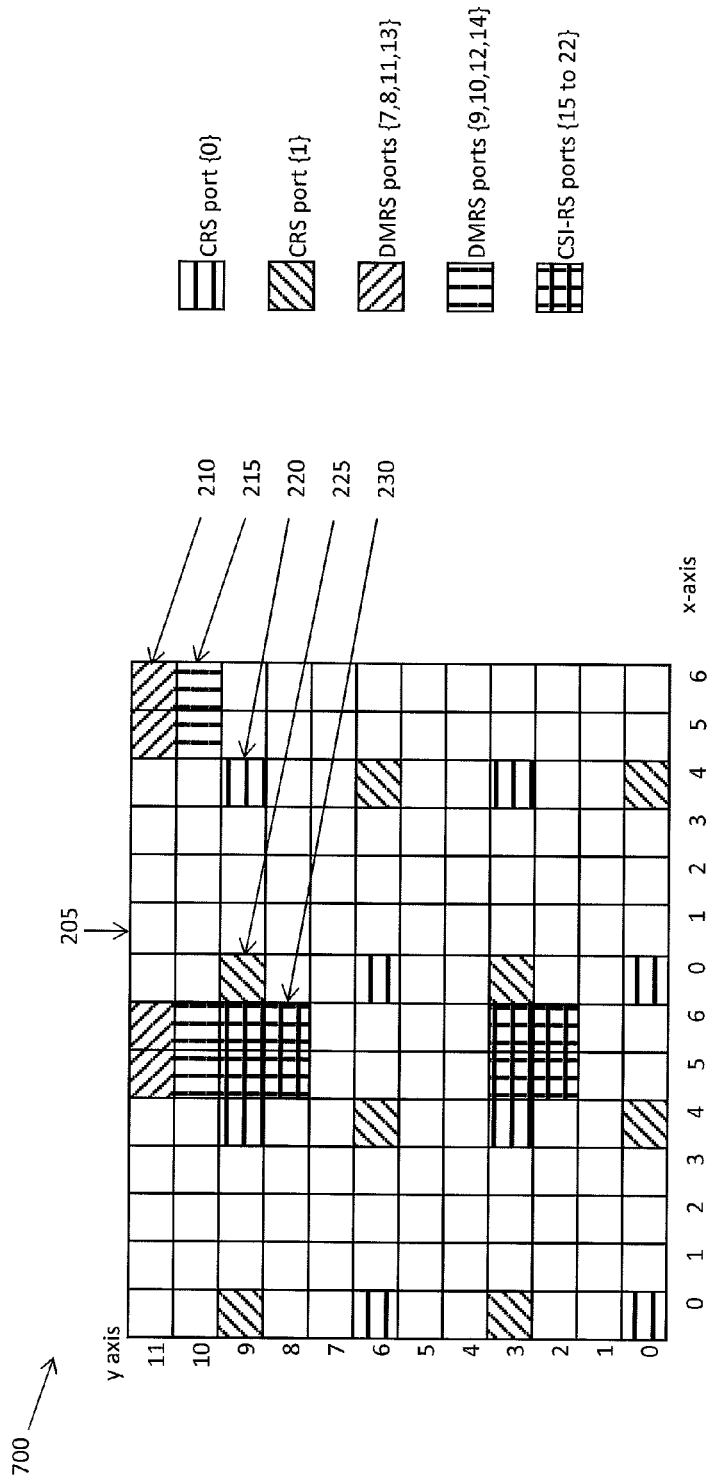
FIG. 7 is a diagram of a PRB pair containing DMRS pattern Alt 5-1.
Figure 8:
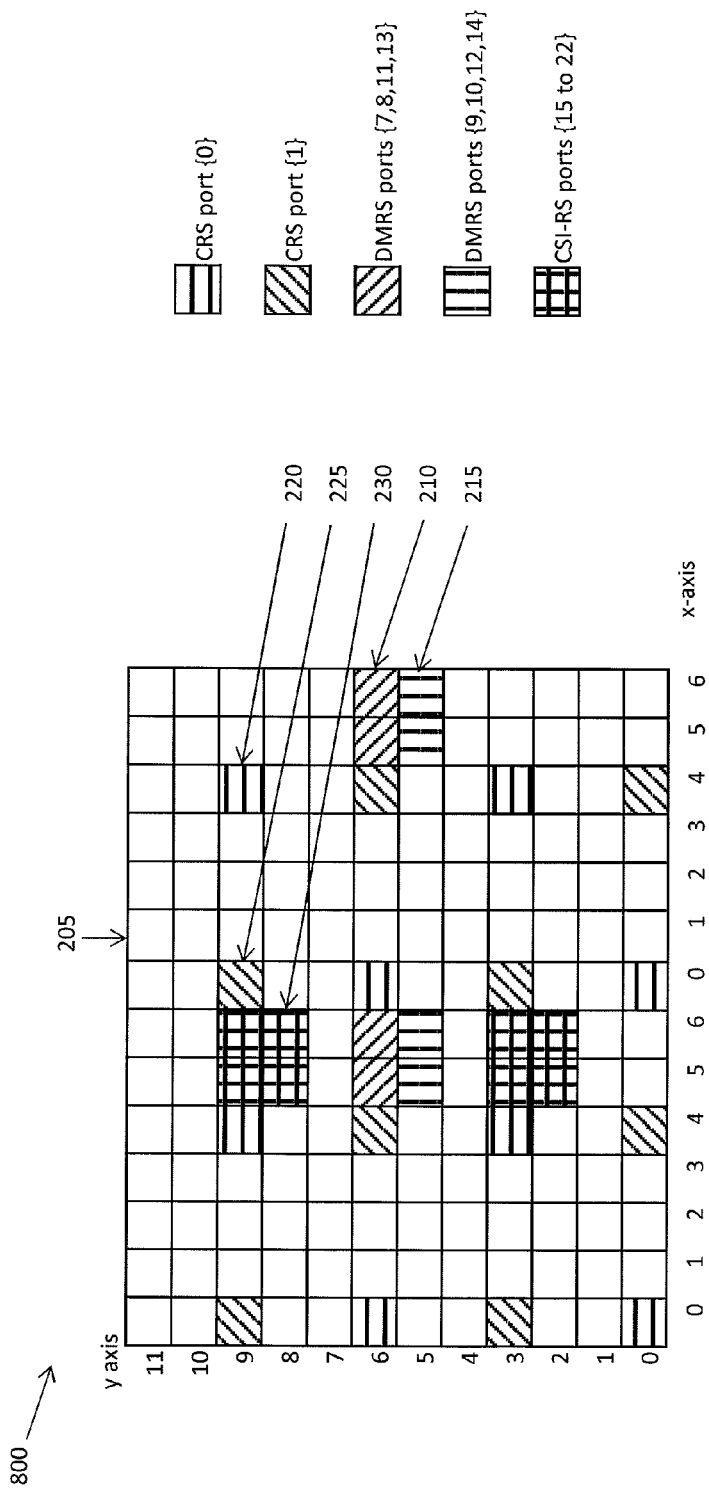
FIG. 8 is a diagram of a PRB pair containing DMRS pattern Alt 5-2.
Figure 9:
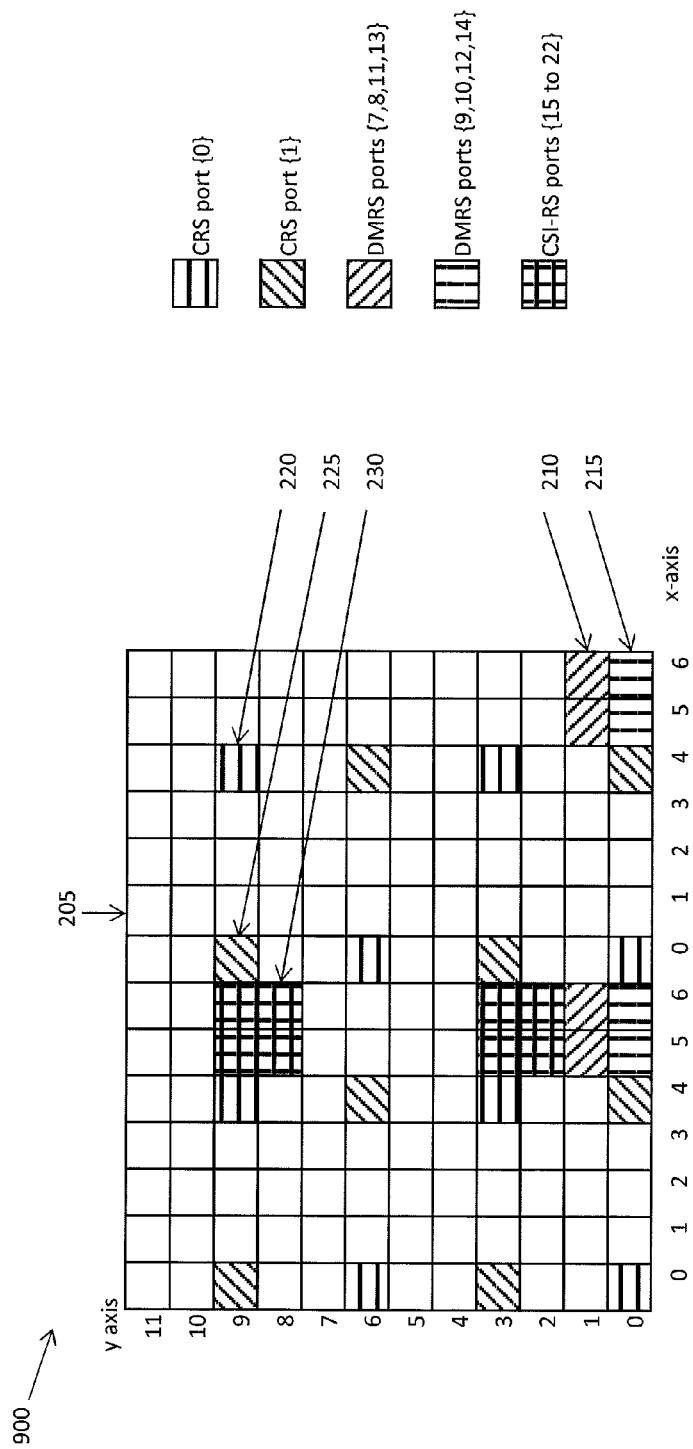
FIG. 9 is a diagram of a PRB pair containing DMRS pattern Alt 5-3.

FIG. 7 is a diagram of a PRB pair containing DMRS pattern Alt 5-1 700. FIG. 8 is a diagram of a PRB pair containing DMRS pattern Alt 5-2 800. FIG. 9 is a diagram of a PRB pair containing DMRS pattern Alt 5-3 900. Each of DMRS pattern Alt 5-1, DMRS pattern Alt 5-2, and DMRS pattern Alt 5-3 may use one pair of REs along the frequency domain to carry DMRS signals. DMRS pattern Alt 5-1, DMRS pattern Alt 5-2, and DMRS pattern Alt 5-3 may each support eight DMRS ports, i.e. DMRS ports {7,8, 11, 13} 210 and DMRS ports {9,10, 12, 14} 215, which means eight layer MIMO transmission may be supported using DMRS pattern Alt 5-1, DMRS pattern Alt 5-2, and 5-3, each using eight REs 205.

Figure 10:
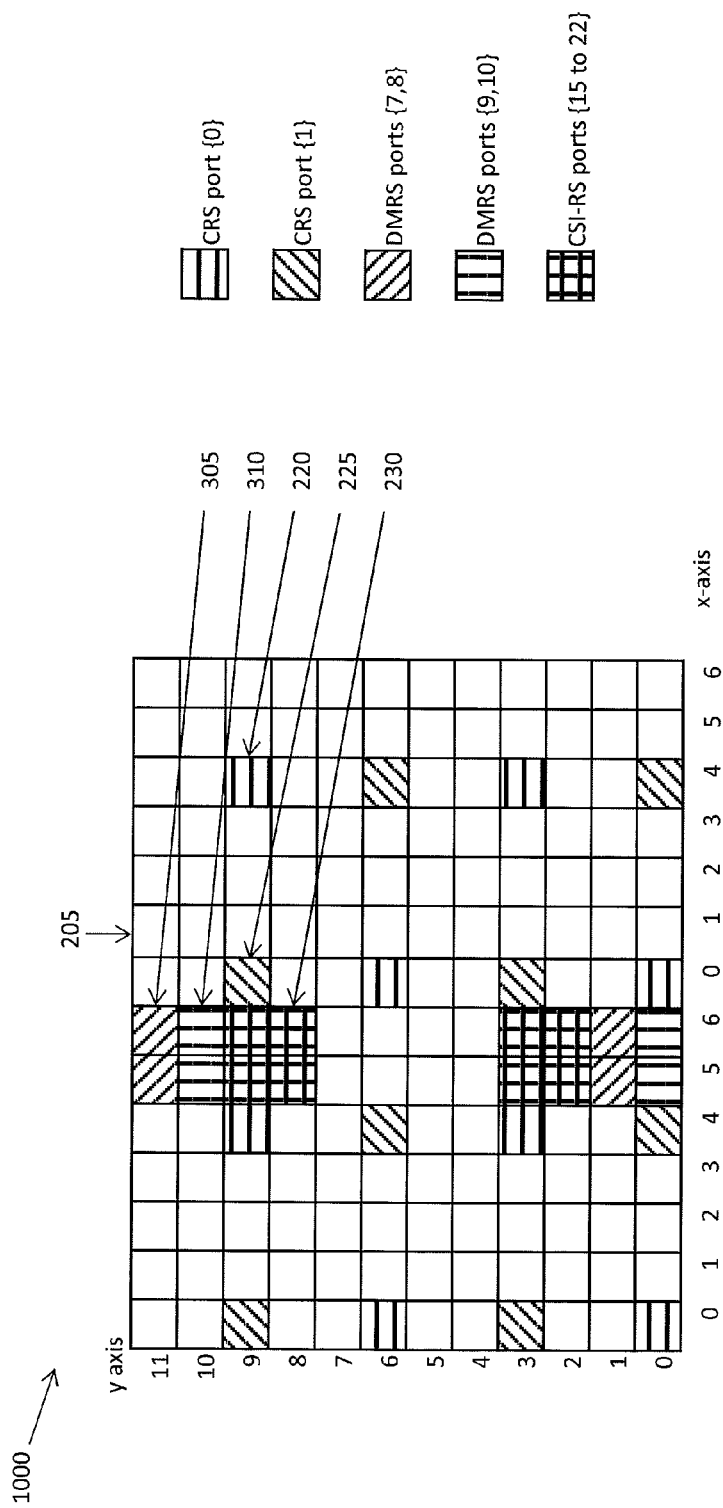
FIG. 10 is a diagram of a PRB pair containing DMRS pattern Alt 6.
Figure 11:
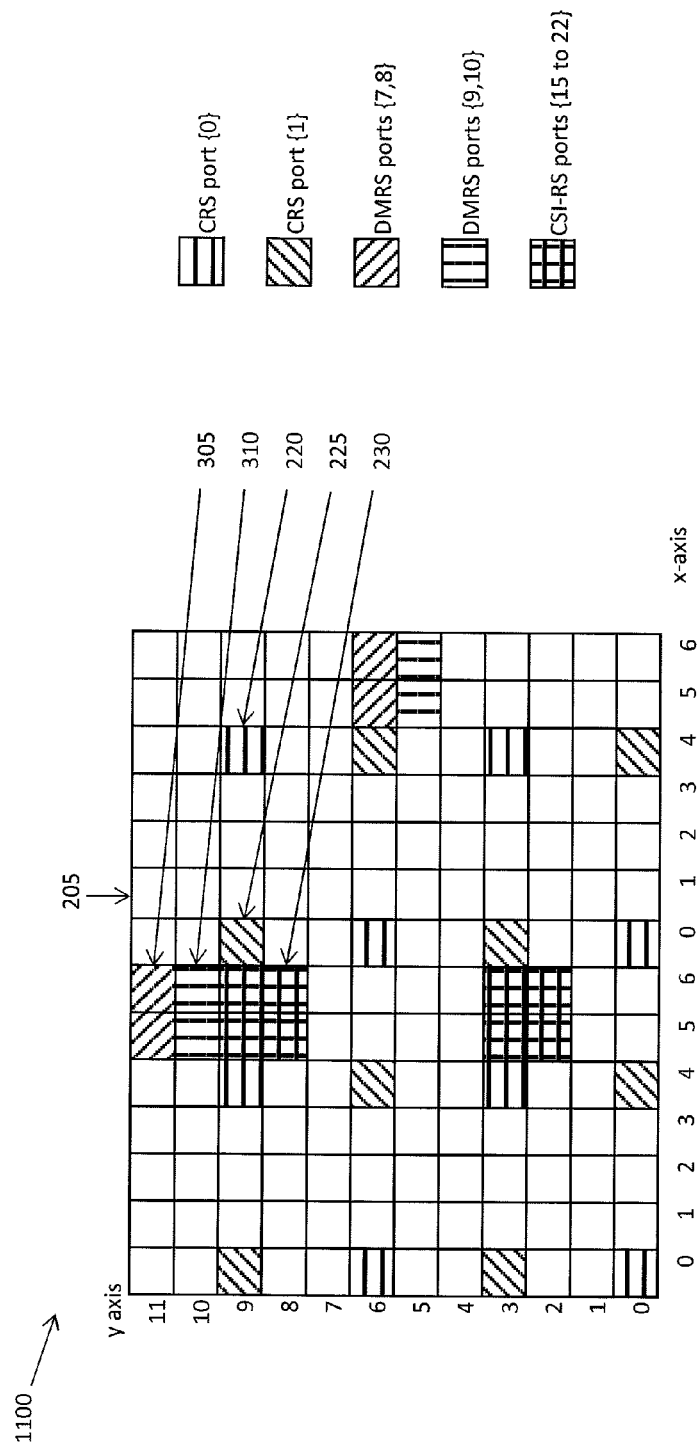
FIG. 11 is a diagram of a PRB pair containing DMRS pattern Alt 7.
Figure 12:
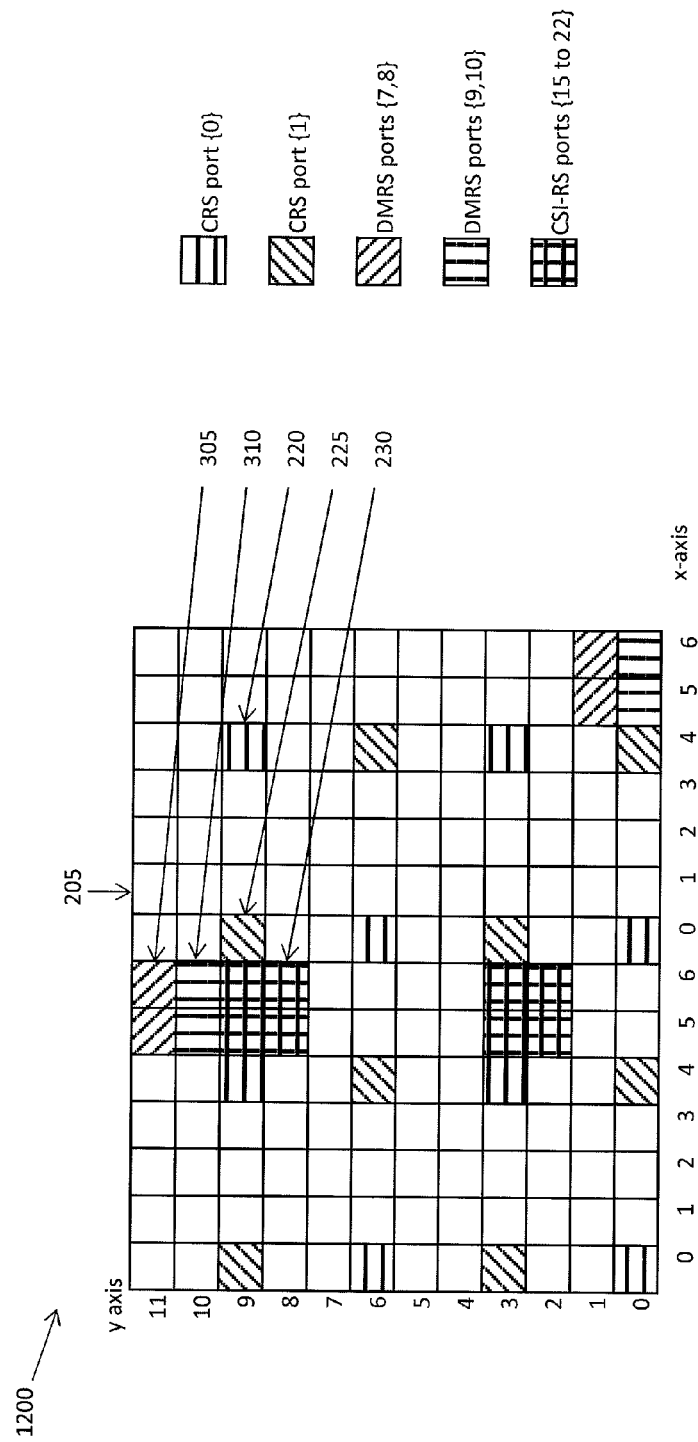
FIG. 12 is a diagram of a PRB pair containing DMRS pattern Alt 8.
Figure 13:
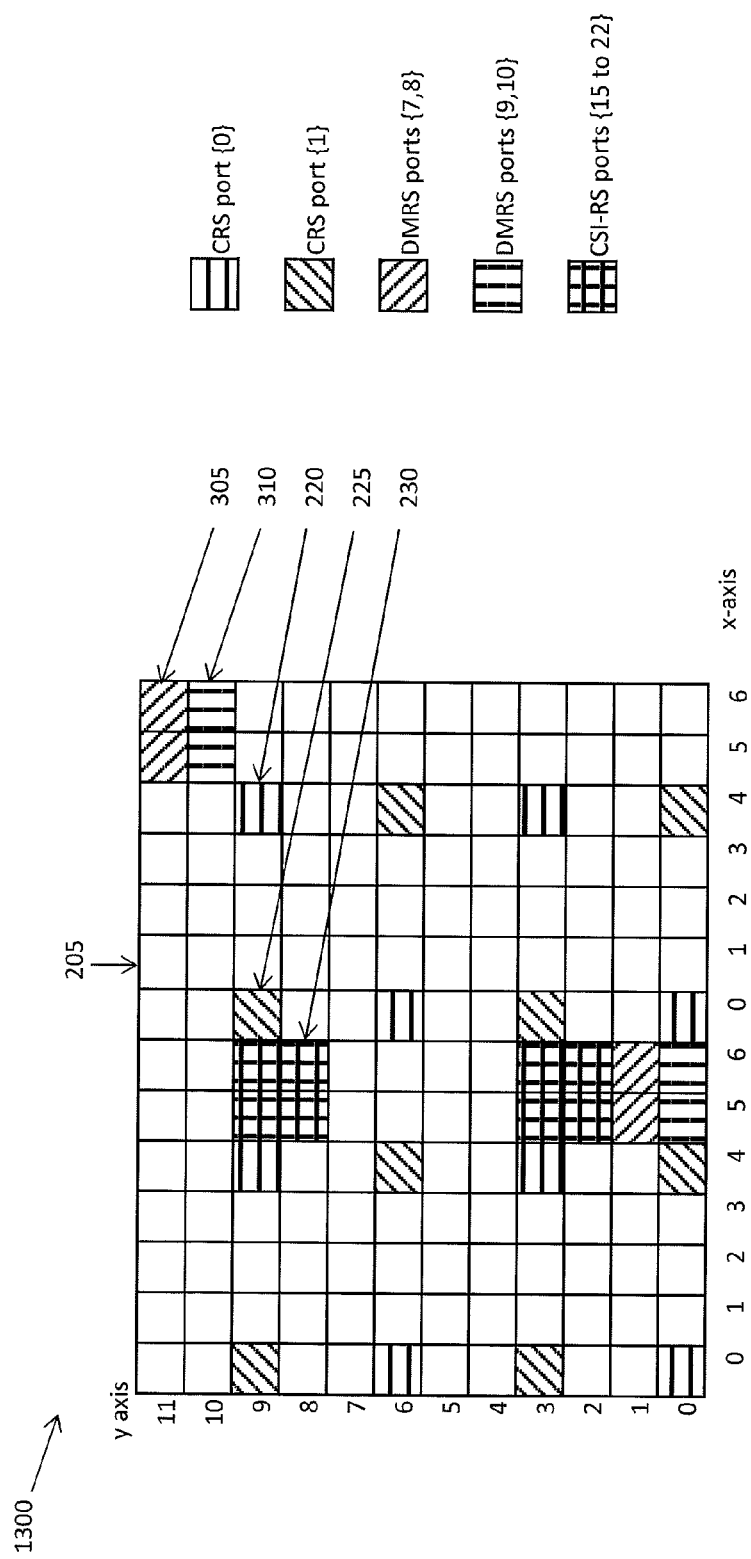
FIG. 13 is a diagram of a PRB pair containing DMRS pattern Alt 9.

FIG. 10 is a diagram of a PRB pair containing DMRS pattern Alt 6 1000. FIG. 11 is a diagram of a PRB pair containing DMRS pattern Alt 7 1100. FIG. 12 is a diagram of a PRB pair containing DMRS pattern Alt 8 1200. FIG. 13 is a diagram of a PRB pair containing DMRS pattern Alt 9 1300. Each of DMRS pattern Alt 6, DMRS pattern Alt 7, DMRS pattern Alt 8, and DMRS pattern Alt 9 may support four DMRS ports, i.e. DMRS ports {7,8} 305 and DMRS ports {9,10} 310, which means four layer MIMO transmission may be supported using DMRS pattern Alt 6, DMRS pattern Alt 7, DMRS pattern Alt 8, and DMRS pattern Alt 9, each using eight REs 205.

Table 2 below summarizes the DMRS overhead in the PRB pair arrangements described above. DMRS overhead reduction may reduce the DMRS overhead from 14% in TM 9 to between 4.76% and 9.5% using the embodiments described above.

TABLE 2

DMRS overhead comparison

| | TM 9 | Alt 1 | Alt 2 | Alt 3 | Alt 4 | Alt 5-9 |
|---|---|---|---|---|---|---|
| % DMRS per PRB pair | 14% | 7% | 7% | 7% | 9.5% | 4.76% |

As described above, in Rel-10 TM9, length four OCC is applied along the time domain to multiplex four DMRS ports transmitted in each PRB pair. Thus, four REs are required in the same subcarrier to support four DMRS ports. Some of the embodiments described above only have 1 pair of REs along the time domain and thus only support 2 DMRS ports per subcarrier. As such, some of the proposed DMRS patterns may support up to 4 DMRS ports, for example, DMRS pattern Alt 1, DMRS pattern Alt 2, and DMRS pattern Alt 3, while others may support up to 8 DMRS ports, for example, DMRS pattern Alt 4, DMRS pattern Alt 5-1, DMRS pattern Alt 5-2, and DMRS pattern Alt 5-3.

Figure 14:
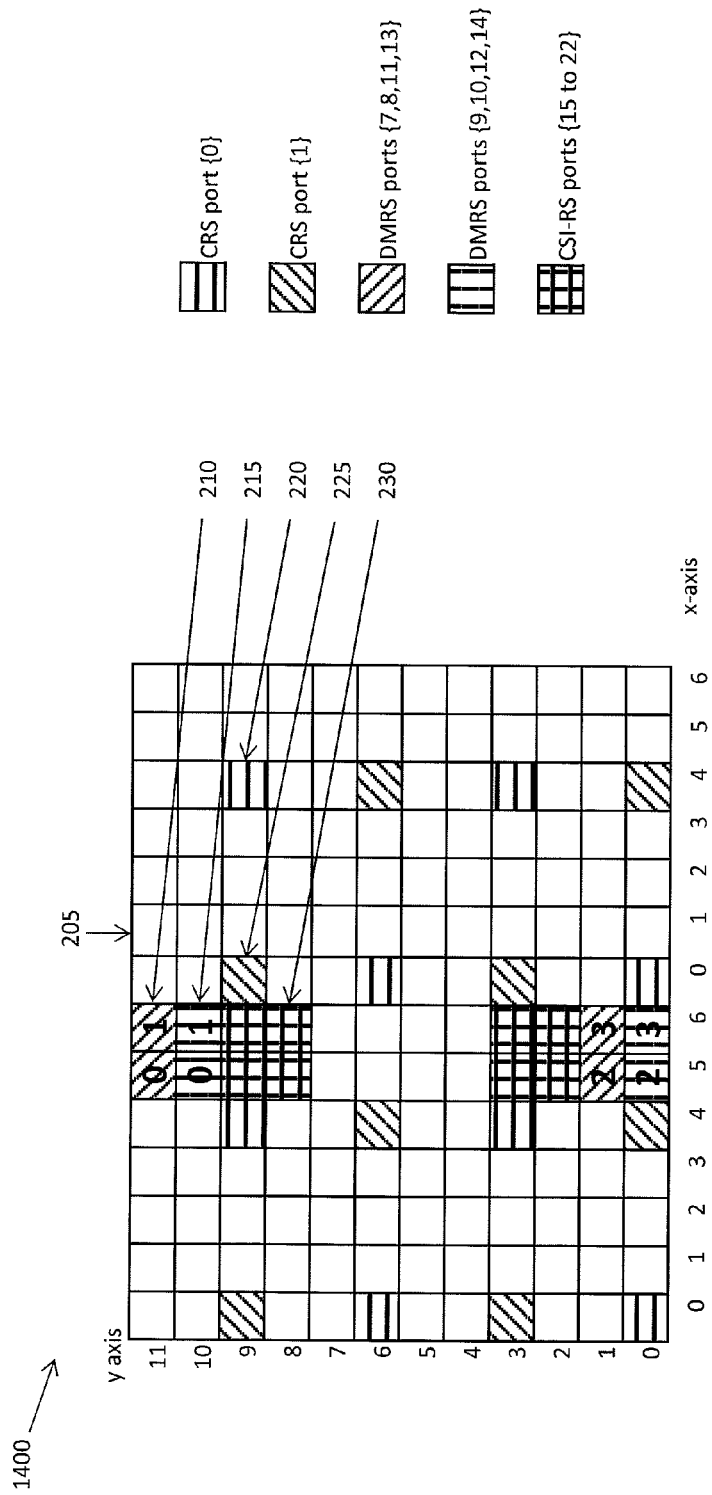
FIG. 14 is a diagram of a PRB pair containing DMRS pattern Alt 10.

FIG. 14 is a diagram of a PRB pair containing DMRS pattern Alt 10 1400. If the OCC is applied differently than it is applied in Rel-10 TM9 (i.e. only along the time domain), different DMRS patterns may be generated. DMRS ports {7,8,11,13} 210 may use OCC code along both time and frequency domain, similarly DMRS ports {9,10,12,14} 215 may use OCC code along both time and frequency domain. REs labelled with a 0 may contain the OCC code with index 0, $\overline{w}_p(0)$, for the DMRS of each DMRS port as defined in Table 1. REs labelled with a 1 may contain the OCC code with index 1, $\overline{w}_p(1)$, for the DMRS of each DMRS port as defined in Table 1. REs labelled with a 2 may contain the OCC code with index 2, $\overline{w}_p(2)$, for the DMRS of each DMRS port as defined in Table 1. REs labelled with a 3 may contain the OCC code with index 3, $\overline{w}_p(3)$, for the DMRS of each DMRS port as defined in Table 1. As the channel does not change much in both time and frequency domain within such a small square, orthogonality among different DMRS ports transmitted on the same sets of REs may be maintained.

Figure 15:
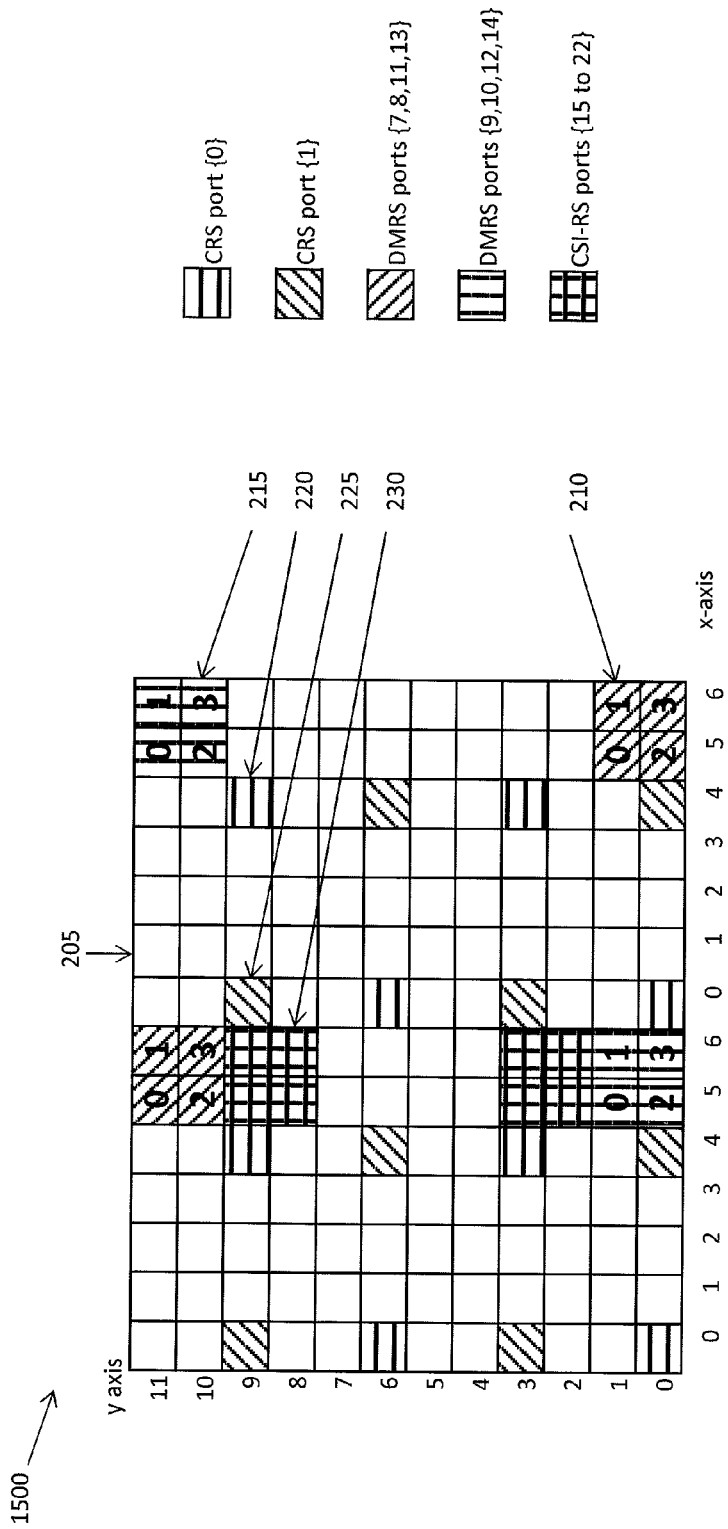
FIG. 15 is a diagram of a PRB pair containing DMRS pattern Alt 11.

FIG. 15 is a diagram of a PRB pair containing DMRS pattern Alt 11 1500. DMRS ports {7,8,11,13} 210 may be transmitted in two sets of REs, with each set confined within a small square, in separate PRBs. Likewise DMRS ports {9,10,12,14} 215 may be transmitted in two sets of REs, with each set confined within a small square, in separate PRBs. REs labelled with a 0 may contain the OCC code with index 0 for the DMRS of a DMRS port as defined in Table 1. REs labelled with a 1 may contain the OCC code with index 1 for the DMRS of a DMRS port as defined in Table 1. REs labelled with a 2 may contain the OCC code with index 2 for the DMRS of a DMRS port as defined in Table 1. REs labelled with a 3 may contain the OCC code with index 3 of a DMRS port as defined in Table 1. DMRS pattern Alt 11 occupies the same REs and has the same overhead as DMRS pattern Alt 4. However, PRB pair with DMRS pattern Alt 11 may have a more balanced DMRS density along both time and frequency domains and may be less impacted by channel variations along both time and frequency, and therefore, may lead to better channel estimation performance.

The DMRS patterns described herein may use a subset of REs that are used by the DMRS pattern typically used by TM9 for DMRS transmission. As used herein, subset may mean fewer REs are used to transmit DMRS. Subset may also include shifting the location of the DMRS REs in a PRB pair along either time or frequency, or in some cases both time and frequency. Subset may also include stretching or rotating a TM9 DMRS pattern in a PRB pair along either time or frequency, or in some cases both time and frequency. As used herein, subset may include DMRS patterns whose DMRS overhead is less than a typical TM9 DMRS pattern DMRS overhead.

In some embodiments, small cells may be deployed in a cluster each covering a small area and supporting relatively few users. Small cell eNB may be more cost-effective with reduced functionalities and hardware than a macro-cell eNB. One way to save costs may be to support fewer transmit antennas, for example, support 2 or 4 transmit antennas instead of 8. Small cell deployment may require less planning efforts than macro-cell deployments (i.e. no towers etc.). Small cell clustering may lead to large overlaps in coverage and strong inter-cell interference among small cells in a cluster. In some embodiments, the 8 DMRS ports may be allocated to different small cells in a cluster in order to reduce interference.

Figure 16:
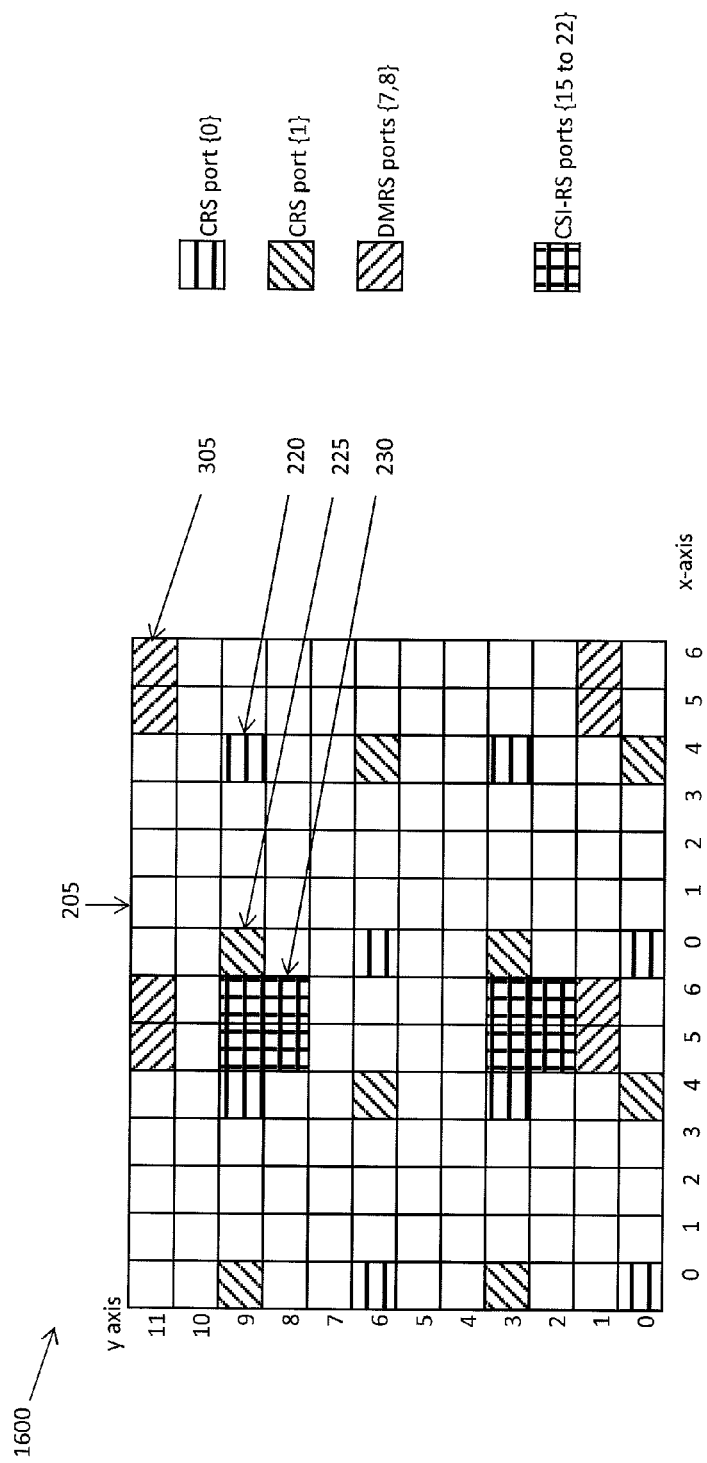
FIG. 16 is a diagram of a PRB pair used by a first small cell in a cluster.
Figure 17:
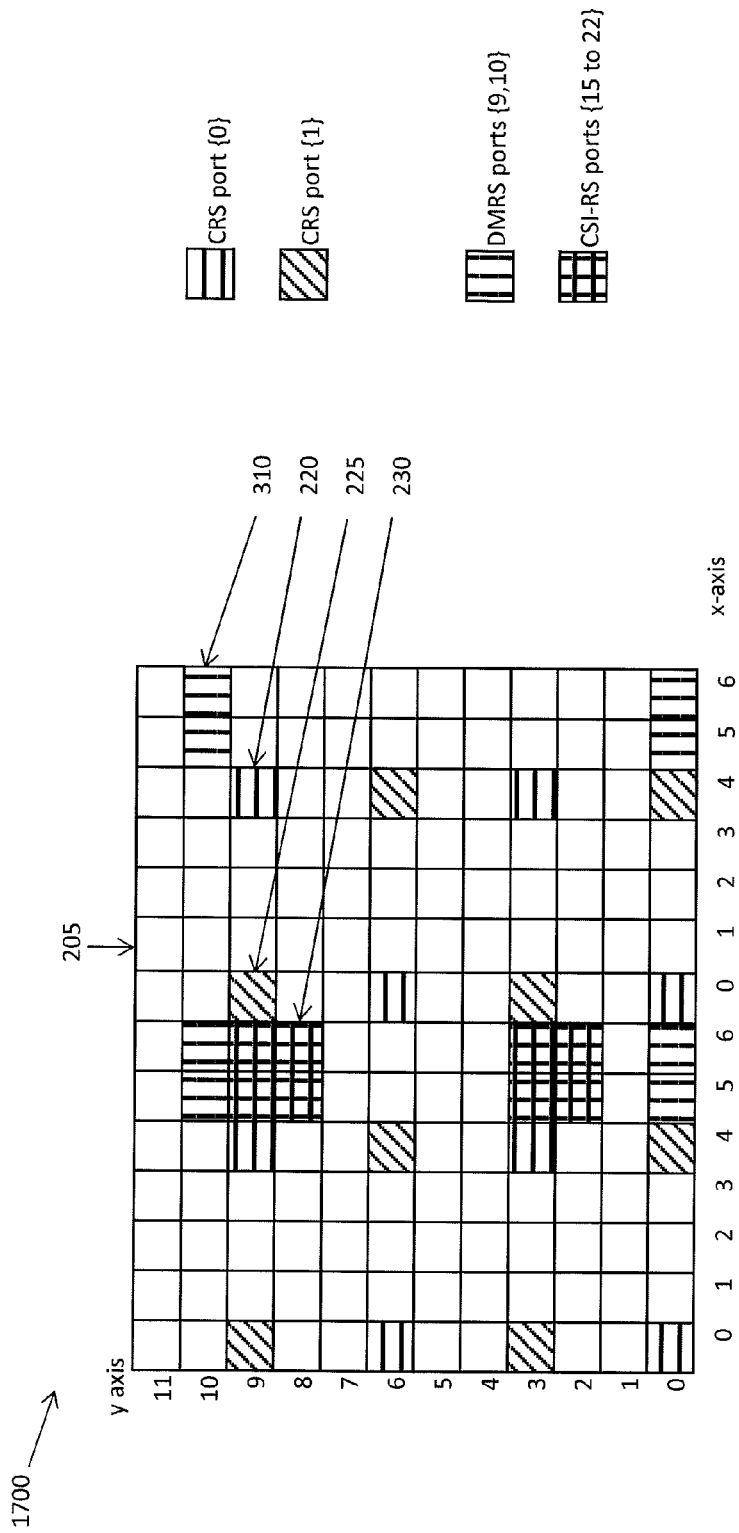
FIG. 17 is a diagram of a PRB pair used by a second small cell in a cluster.
Figure 18:
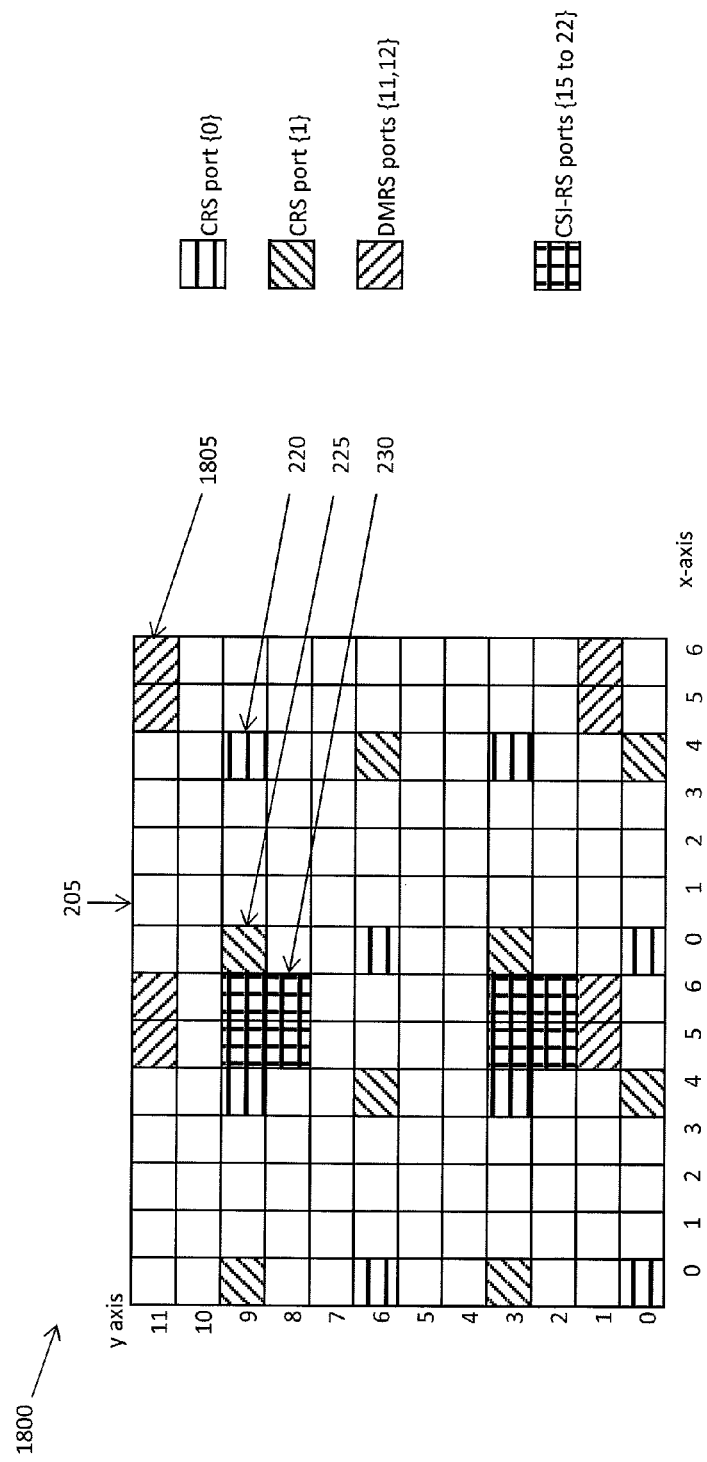
FIG. 18 is a diagram of a PRB pair used by a third small cell in a cluster.

FIG. 16 is a diagram of a PRB pair 1600 used by a first small cell in a cluster. FIG. 17 is a diagram of a PRB pair 1700 used by a second small cell in a cluster. FIG. 18 is a diagram of a PRB pair 1800 used by a third small cell in a cluster. DMRS ports {7,8} 305 may be allocated to the first small cell, DMRS ports {9,10} 310 may be allocated to the second small cell, and DMRS ports {11,12} 1805 may be allocated to the third small cell. This type of allocation causes the DMRS ports in each cell to be orthogonal to each other, and thus may reduce the inter-cell interference on DMRS. Such orthogonal DMRS port assignment among small cells may also facilitate inter-cell interference estimation and cancellation.

Transmitting several consecutive PRB pairs with the same precoding to the same UE may be referred to herein as PRB bundling. PRB bundling may be introduced to improve channel estimation performance. PRB bundling may include the eNB using the same precoding vector across the PRB pairs that are bundled together. This may allow the UE to perform channel interpolation over DMRS across bundled PRBs pairs. If such function is combined with the DMRS design described herein, it may allow joint DMRS design to maintain effective channel estimation performance with reduced DMRS overhead.

As discussed above, for small cells the RMS delay spread may be small, which leads to a relatively flat channel along frequency domain. Therefore, coarse feedback granularity and resource assignment granularity would be suitable for use in small cells. Coarse granularity as used herein means that a larger sub-band size may be used for both channel feedback in the uplink and resource assignment in the downlink. For small cells, normally fewer UEs would be supported than macro-cells, but each UE will typically transmit and/or receive a larger payload. Increasing sub-band size may enable channel estimation to be conducted across multiple PRB pairs jointly. For example, if three consecutive PRB pairs are assigned to a UE, channel interpolation may be used on reference signaling across the consecutively assigned PRB pairs to improve the performance of channel estimation. Thus, the design of DMRS for small cell may be selected based on the use of PRB bundling and may result in further DMRS overhead reduction.

Figure 19:
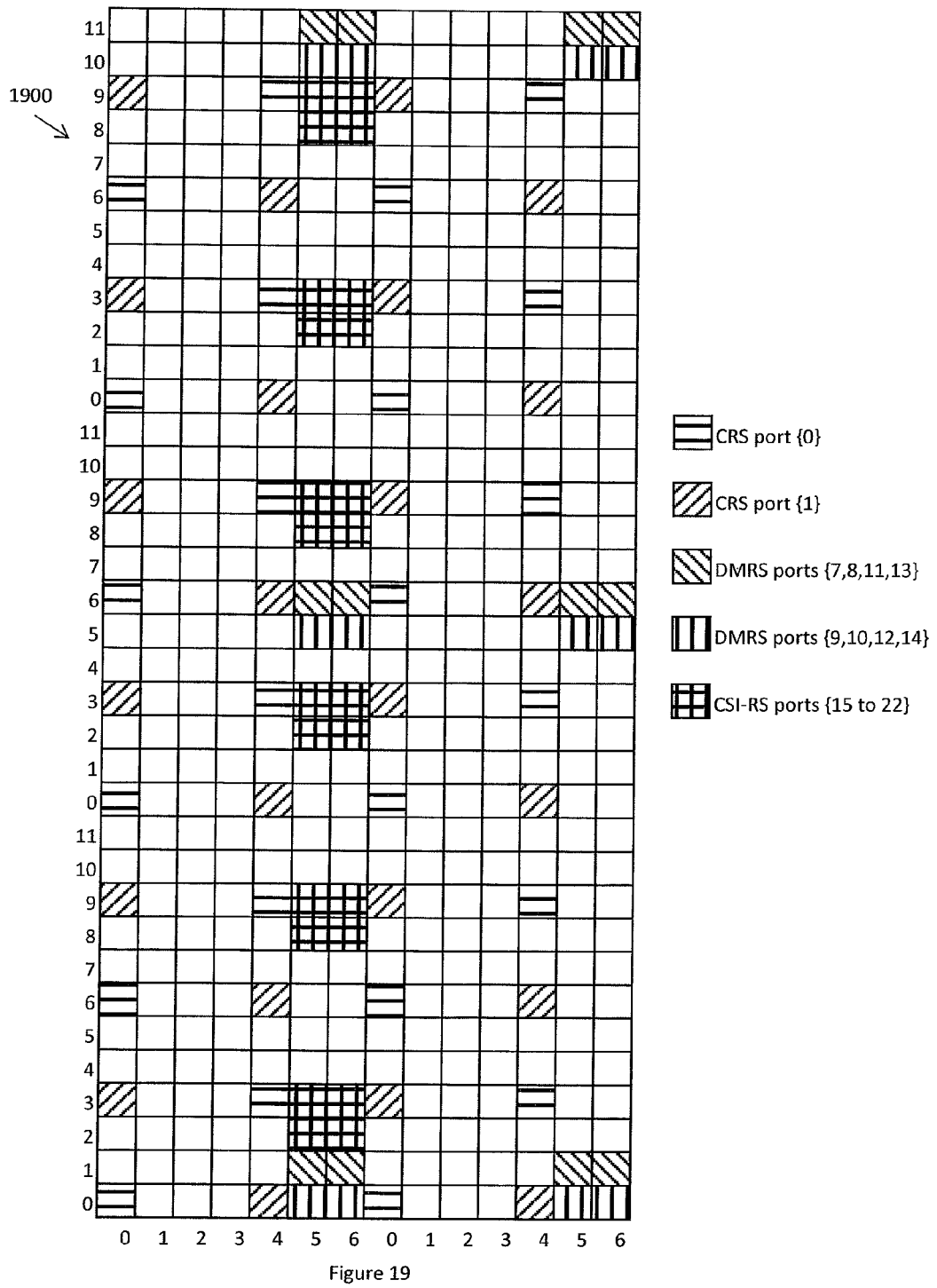
FIG. 19 is a diagram of PRB bundling using three PRB pairs.

In an embodiment, PRB bundling may be used, and three consecutive PRB pairs may be assigned to a UE. FIG. 19 is a diagram of PRB bundling using three PRB pairs 1900. As shown in FIG. 19, the first consecutive PRB pair may be configured using DMRS pattern Alt 5-1, the second consecutive PRB pair may be configured using DMRS pattern Alt 5-2, and the third consecutive PRB pair may be configured using DMRS pattern Alt 5-3. The channel interpolation and extrapolation may then be used over DMRS in each of the three PRB pairs to get the channel estimation performance across all three PRB pairs. Further, the location of the DMRS ports changes along the frequency domain from one PRB pair to the next, thus compensating for any interference resulting along the frequency domain.

Figure 20:
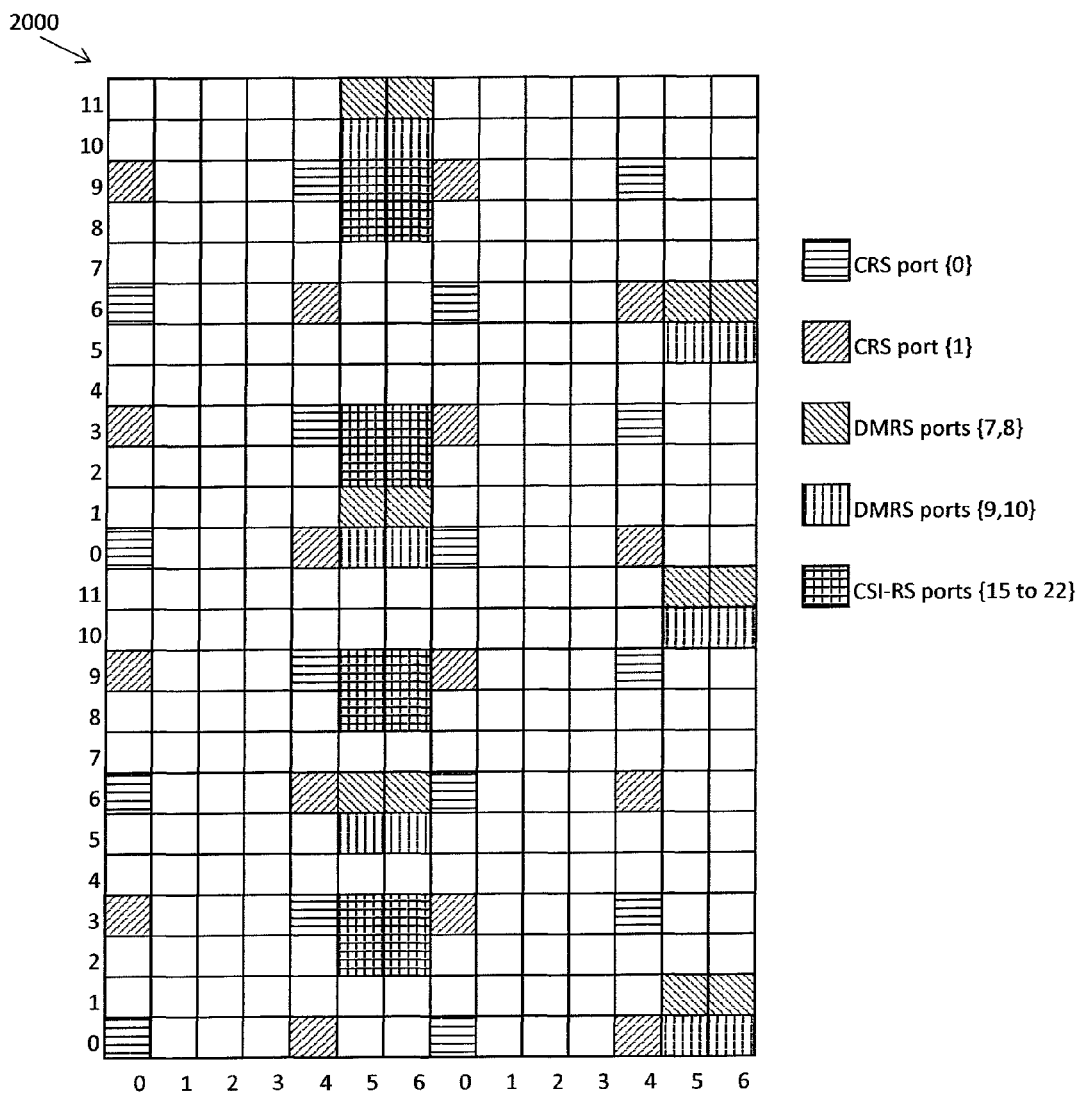
FIG. 20 is a diagram of PRB bundling using two PRB pairs.

In another embodiment, PRB bundling may be used, and two consecutive PRB pairs may be assigned to a UE. FIG. 20 is a diagram of PRB bundling using two PRB pairs 2000. As shown in FIG. 20, DMRS pattern Alt 2 and DMRS pattern Alt 3 may be assigned to consecutive PRB pairs scheduled to the same UE. This may result in balanced DMRS distribution across the PRB pairs and thus improve the overall channel estimation performance relative to the case when a single DMRS pattern (i.e. only DMRS pattern Alt 2) is repeated across PRB pairs.

An eNB may bundle PRBs based on their index in system bandwidth, where the bundling size may be based on system bandwidth. A similar mechanism may be used in PRB bundling for a small cell and its association with DMRS patterns. For example, the PRB pairs in the system bandwidth may be indexed from lowest frequency to highest frequency over the whole system bandwidth. Within the bundled PRB, the same precoding shall be used by eNB. DMRS design as described herein may be incorporated by a one-to-one mapping relation between one DMRS pattern and one PRB pair. As an example, DMRS pattern Alt 5-1 may be associated with a first PRB pair corresponding to the lowest frequency, DMRS pattern Alt 5-2 may be associated with a second PRB pair, and DMRS pattern Alt 5-3 may be associated with a third PRB pair, this association format may be repeated for the remaining PRB pairs from lowest frequency to highest frequency. With such one-to-one mapping between DMRS pattern and PRB pair for a new UE (e.g. Rel-12 UE and beyond) assigned with a number of consecutive PRB pairs by an eNB, the UE may automatically determine the DMRS patterns for each PRB pairs it is assigned based on the PRB pair index. For example, the UE may determine that DMRS pattern Alt 5-2, Alt 5-1 and Alt 5-3, may be transmitted in each of the three consecutive PRB pairs respectively, or they may follow any other predetermined order. Both eNB and UE may follow an implicit rule to determine the DMRS pattern used for a particular PRB pair. It should be noted that such implicit association may apply when the PRB pair is assigned to a new UE, which supports such new DMRS patterns. For those PRB pairs assigned to legacy UE, which does not support such new DMRS patterns, the DMRS patterns specified in TM9 shall still be used. While DMRS patterns Alt 5-1, 5-2, and 5-3 are used in the example above, it should be understood that any of the DMRS patterns described herein may be used.

Figure 21:
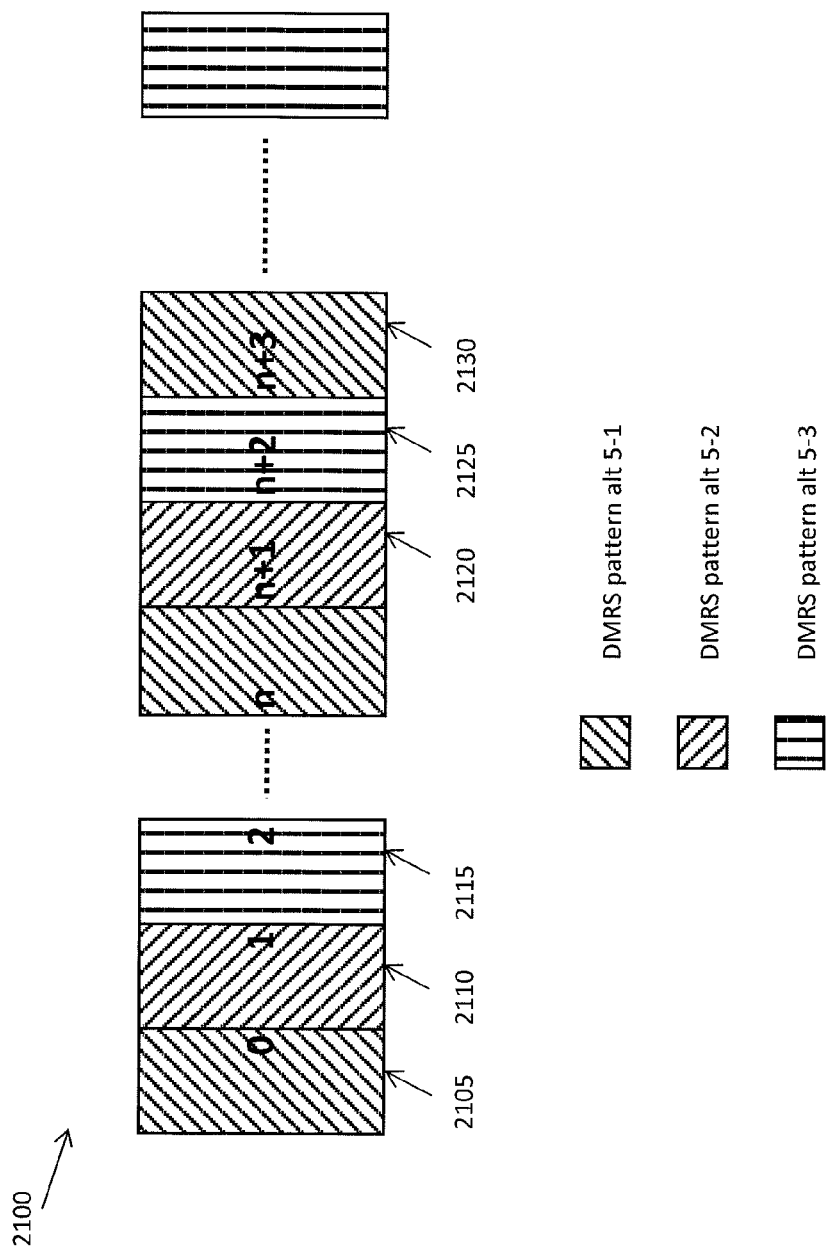
FIG. 21 is a diagram of DMRS pattern association with PRB bundling.

FIG. 21 is a diagram of DMRS pattern association with PRB bundling 2100. PRB pair #0 2105 may use DMRS pattern Alt 5-1, PRB pair #1 2110 may use DMRS pattern Alt 5-2, and PRB pair #2 2115 may use DMRS pattern Alt 5-3. As described above, this association may be repeated for subsequent PRB pairs. If a new UE is scheduled using PRB pair #n+1 2120, PRB pair #n+2 2125, and PRB pair #n+3 2130, the PRB pairs may use DMRS pattern Alt 5-2, DMRS pattern Alt 5-3, and DMRS pattern Alt 5-1, respectively. The UE may assume the DMRS patterns to use implicitly based on the PRB index or the DMRS patterns may be explicitly provided to the UE.

The above described DMRS patterns associated with a UE may be either fixed or configurable. For example, the DMRS pattern configuration may be dynamic, e.g., signaled to the UE as part of the DL grant or the DMRS pattern configuration may be signaled to the UE semi-statically through broadcasting or higher layer signals like RRC. If the DMRS pattern configuration is RRC signaled, it may be UE-specific or cell-specific.

The DMRS configuration may be selected based on various factors. For example, if a UE is stationary, or with very low mobility, it may be configured with a DMRS pattern with low density in the time domain, e.g. DMRS pattern Alt 1. As another example, if the UE has medium mobility, it may be configured with DMRS pattern with low density in frequency domain but relatively higher density in time domain, e.g. DMRS pattern Alt 4 and DMRS pattern Alt 5. As some DMRS patterns may only support a limited number of DMRS ports such as DMRS pattern Alt 1, DMRS pattern Alt 2, and DMRS pattern Alt 3, the configuration of DMRS patterns may also depend on the number of layers that an eNB may schedule to the UE, or the number of layers that a UE is capable to support.

In some embodiments, if the UE is semi-statically configured, new transmission modes which may be associated with new DMRS patterns described herein may not be required. For example, if the UE is a legacy UE, it will continue to use the TM 9 DMRS pattern. If the UE is a new UE and configured with one or more of the DMRS patterns described herein, it will automatically assume those DMRS patterns during scheduled PDSCH transmissions.

As described above, small cells may be deployed for hot spots and indoor environments. As the coverage of small cell is quite small physically, a cluster of small cells may be deployed together to cover a larger area. In addition, it may be preferred that minimum planning effort be required for small cell deployment. Clustered deployment of small cells may lead to coverage overlaps among small cells and thus potentially cause strong interference among small cells. DMRS defined in TM9 may be transmitted in the same REs in a PRB pair from all the cells, thereby colliding with each other. The collisions may degrade the channel estimation performance and thereafter the system throughput. To avoid such degradation, it may be beneficial to use orthogonal REs for DMRS transmission among small cells. For example, DMRS patterns Alt 2 and Alt 3 may be used in overlapping small cells, in this case the different DMRS patterns may avoid DMRS collision with each other and therefore lead to improved channel estimation performance. This embodiment may be described as DMRS flipping, which may be considered as a special case of shifting. Alternatively, DMRS transmission from three small cells may use DMRS patterns Alt 5-1, Alt 5-2, and Alt 5-3 respectively; in this case, the DMRS from these cells won't collide with each other and thus maintain channel estimation performance from degradation. Furthermore, DMRS collision with PDSCH may be avoided by muting REs in a PRB pair from the serving cells that used to transmit DMRS patterns in neighboring cells. Such RE configuration may be signaled to the UE for it to use in rate matching.

In some embodiments, DMRS pattern shifting may be supported by small cells coordinating with each other, the DMRS pattern may be explicitly signaled among the small cells. For each small cell, its assigned DMRS pattern may be signaled to the UE, e.g., through RRC or broadcasting of system information. Alternatively, each DMRS pattern may be assigned to a cell implicitly. For example, each DMRS pattern may be given an index from the set of {0, 1, 2, ... }, then the cell ID of a small cell may be used to select the DMRS pattern used for the small cell, for example according to the following:

DMRS pattern index=mod(cell ID, N); Where N is the number of DMRS patterns available.

At the UE side, the UE will determine the DMRS pattern implicitly based on the cell ID as described herein.

While one simple formula is provided for implicitly determining a DMRS pattern, any number of methods and formulas may be used to implicitly determine a DMRS pattern.

In another embodiment, available DMRS patterns may be generated by shifting the existing DMRS pattern on the frequency domain. For example, the DMRS pattern Alt 2 may be used to generate at least 3 different DRMS patterns by shifting along the frequency domain. When PRB bundling is applied, the available DMRS patterns may be determined by the minimum bundling size as well. It is possible some patterns may have partial overlap, but the neighboring small cells may be configured to prevent significant DMRS overlapping among neighboring small cells.

In some embodiments, in small cells, DMRS may be used for PDSCH demodulation, instead of using CRS as described in LTE rel-8. In these cases CRS overhead may be reduced. However, minimal CRS may be maintained in order to support UEs for decoding of legacy PDCCH and for channel measurement like RRM. To reduce overhead and further improve system throughput, the number of CRS ports may be limited, for example, to only support 1 or 2 CRS ports in a small cell. In this case, CRS overhead would be limited to less than 9%. Considering that the coverage of small cell is not large, 1 or 2 CRS ports may be enough to support PDSCH for legacy UEs and legacy PDCCH. Further, the mobility measurements (RRM) are mostly handled by the macro-cell, thus the accuracy for the RRM within small cells, where UE mobility is minimal, may not be necessary to be as accurate as in macro-cells. Thus, CRS ports may be reduced to save overhead. However, for legacy carriers that need to support legacy UEs on the small cells, minimal CRS may be supported. In certain embodiments, UEs may monitor the CRS of a macro-cell for the initial RRM, before attaching to a small cell. A flag may be used within the small cell to indicate either "reduced" or "original" CRS usage. The flag may be part of the small cell configuration sent from a macro-cell.

In another embodiment, the CRS may be transmitted only on a subset of symbols/subframes and/or a subset of PRBs. For example, certain subframes may be configured for CRS transmission. Such configuration may be signaled through higher layer signals like RRC. Alternatively, along the frequency domain, some PRB pairs may be configured for CRS transmission, for example, some consecutive PRB pairs and distributed PRB pairs may be configured for CRS transmission. Such configuration may also be signaled to the UE semi-statically using higher layer signals like RRC. Such configuration may be signaled in SIB.

In some embodiments, DMRS patterns with a reduced number of REs per PRB pair may be transmitted for PDSCH demodulation in a small cell. To support this, a new transmit mode, e.g., TM 11, may be introduced to support PDSCH transmission in small cells. A new transmission mode may also come with a new DCI format (i.e., DCI format 2E), which may allow more changes to satisfy the needs and characteristics of transmission for small cells. The new TM may also be configured to limit the change of DMRS patterns, and therefore make the introduction of such new features backward compatible to legacy UEs. Because TM 9 or TM 10 may still be used for legacy UEs, an existing DMRS pattern for TM9 would still be transmitted in PRBs scheduled for the legacy UE.

In some embodiments, small cells may be deployed in a cluster with a self-organizing capability, which means after the small cell is powered up, the small cell may be able to recognize the presence of an overlaid macro-cell and other neighboring small cells and synchronize with them in time and/or frequency. The small cell may then start to serve the UEs under its coverage. Synchronization among the small cells and the macro-cell may improve interference coordination, network coordination, dual connections, etc. Synchronization may occur between the macro-cell and small cell, and between small cells. The macro-cell and small cells may be synchronized at both radio frame and the OFDM symbol levels.

Several methods may be used for synchronization, for example, the cells may use an air-interface to enable the small cell to synchronize with a macro-cell or neighbouring small cells. After a small cell is deployed (supplied with power and connected with backhaul), in one alternative, it may start to listen to the macro-cell by detecting its primary and secondary synchronization signals (PSS and SSS) similar to the way a UE listens to synchronization signals. When the macro-cell and small cell operate at different frequency bands, like one in 700 MHz, and another in 3.5 GHz, the small cell may need a separate RF chain to listen to the macro-cell downlink. After the small cell detects the PSS/SSS from macro-cell, it may build up subframe synchronization with the macro-cell. The small cell may acquire and decode the physical broadcast channel (PBCH) of the macro-cell for radio frame level synchronization. Further, time and frequency synchronization may be achieved through detecting the cell specific reference signals (CRS) or CSI-RS. The small cell may then transmit its own PSS/SSS if needed.

After sync with the macro-cell, the small cell may still need to perform sync tracking to maintain sync with the macro-cell. In order to maintain sync, the small cell may listen to the downlink from macro-cell or a neighbouring small cell for CRS or CSI-RS. There are several cases that apply to the small cell listening to the downlink from the macro-cell or a neighbouring small cell, six cases are discussed below.

First, the macro-cell and small cell may operate on different frequency bands. In this case, the small cell may need a separate RF chain to receive downlink information from the macro-cell. The small cell may then use the CRS or CSI-RS transmitted in the macro-cell downlink to do sync tracking, i.e. to maintain synchronization over time. In this case, some coordination between the macro-cell and small cell is needed. For example, if the macro-cell operates on a legacy carrier, the small cell could obtain the MBSFN configuration from macro-cell, and try to avoid doing sync tracking in such subframes due to the lack of CRS. if the macro-cell operates on a NCT, the macro-cell should inform the small cell of the subframe locations carrying the RS such as CRS, TRS or CSI-RS.

Figure 22:
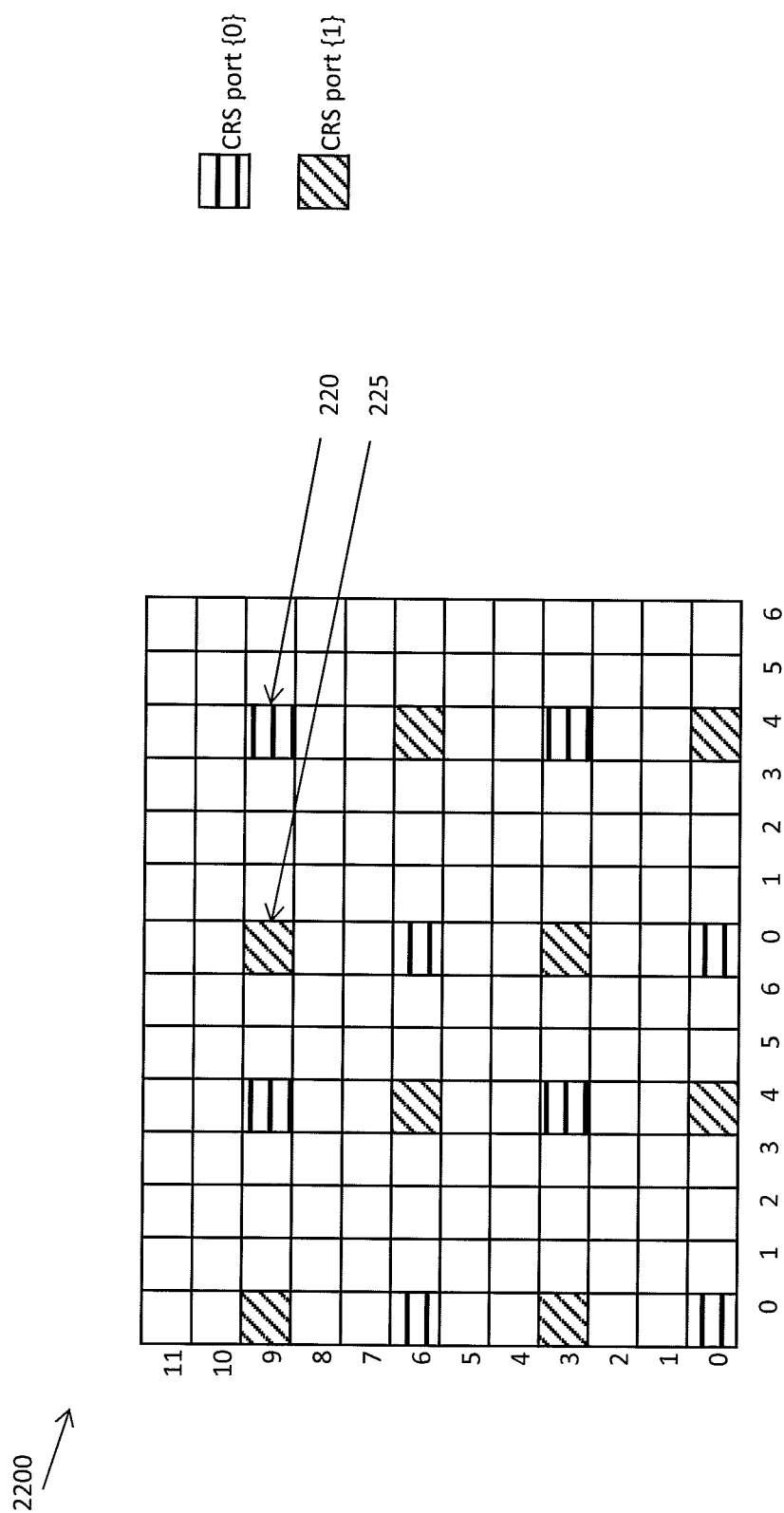
FIG. 22 is a diagram of a macro-cell cell-specific reference signals (CRS) pattern.
Figure 23:
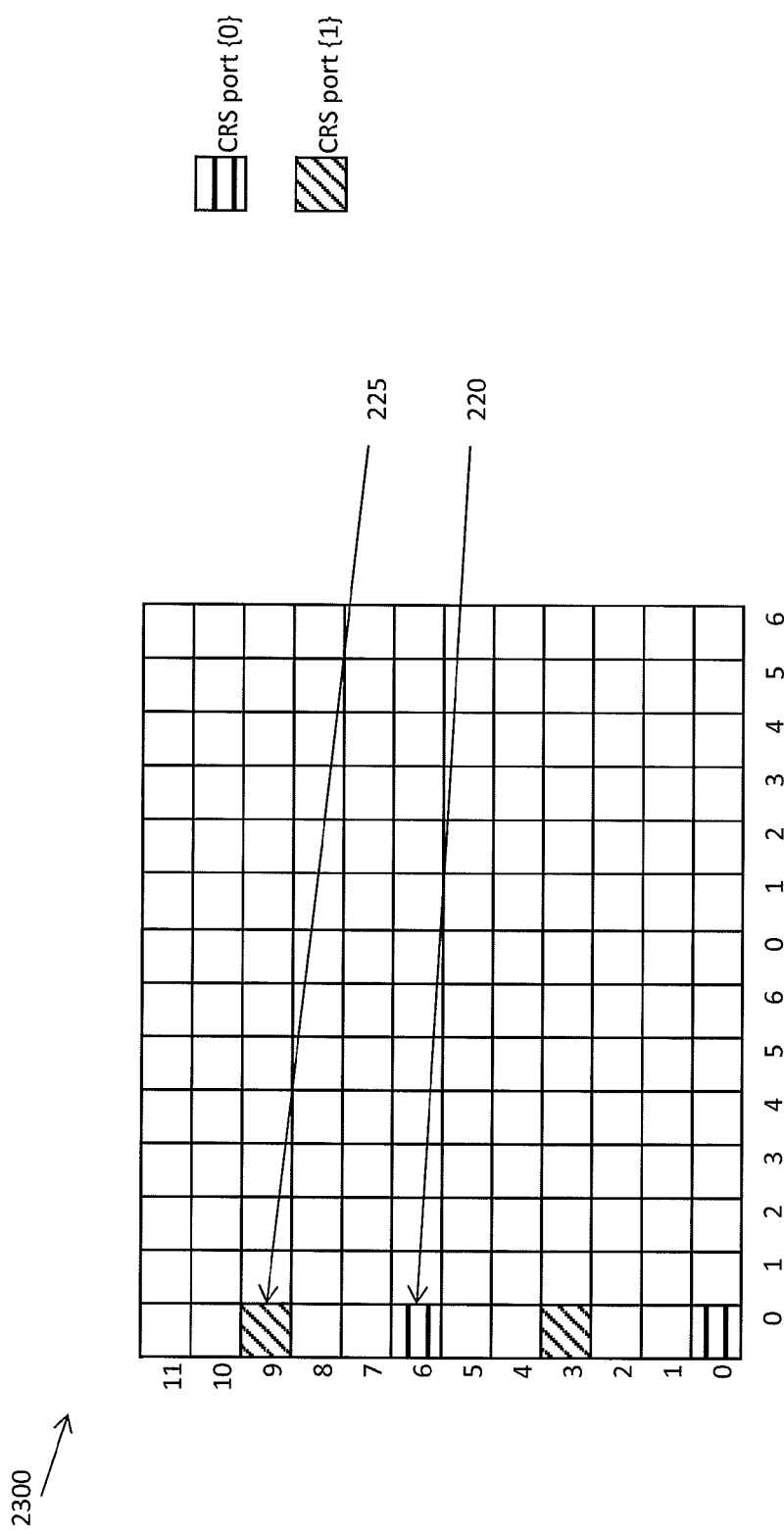
FIG. 23 is a diagram of a small cell CRS pattern.

Second, the macro-cell and small cell may operate on the same frequency (co-channel case). In this case, even if the small cell has a separate RF chain for listening to downlink from macro-cell, there can be an interference issue in some scenarios if the small cell also transmits in its own downlink frequency band at the same time. This is because if not filtered properly, the strong transmitted signal may leakage to the receiver listening to the macro-cell downlink and cause interference as result of third order inter-modulation product (IMP) due to any non-linearity in the receiver. One solution is that the macro-cell could periodically transmit the sync information via a wire-line backhaul. The periodicity depends on the accuracy required for the sync tracking. The other one solution is that the small cell does not transmit when it is listening to the macro-cell. FIG. 22 is a diagram of a macro-cell CRS pattern 2200. The macro-cell may transmit across all OFDM symbols in the PRB pair. FIG. 23 is a diagram of a small cell CRS pattern 2300 where the CRS is only transmitted in the first OFDM symbol in a subframe. The small cell may be configured to only transmit in the first several OFDM symbols of a subframe and listen to the macro-cell during the remaining OFDM symbols in the subframe. This may be achieved by configuring an MBSFN subframe in the small cell. In this case, after transmitting the first one or two OFDM symbols (i.e. a non-MBSFN region used to carry physical control channels such as PCFICH, PHICH, PDCCH), the small cell may then switch to listen to the downlink from macro-cell, as depicted in FIG. 23, and switch back before the start of the next subframe. This is possible because in a MBSFN subframe, the small cell does not transmit CRS signals in the MBSFN region (i.e. the OFDM symbols other than the first one or two OFDM symbols in a subframe) and may not schedule any PDSCH in the subframe. This method of listening to the macro-eNB may be implemented under the existing 3GPP LTE spec and may be transparent to UE. To achieve this, some coordination is needed between small cell and macro-cell and between small cells in a cluster. For example, the macro-cell should transmit normal subframes or ABS which contains CRS when a small cell is configured with MBSFN subframes for synchronization tracking.

For a small cell cluster where a number of small cells are close to each other, coordination is needed in the cluster so that all small cells should be configured with the same set of subframes as MBSFN. That would allow all small cells listen to macro-cell for synchronization tracking, and at the same time do not introduce interference to each other in such subframes. Alternatively, an anchor small cell in a cluster could be configured with MBSFN subframes for synchronization tracking with the macro-cell while the rest of small cells are also configured with MBSFN subframes or subframes that they do not transmit anything (on a new carrier), so that they do not cause interference to the anchor small cell during its synchronization tracking. These small cells in a cluster could conduct synchronization and its tracking with the anchor small cell. For example they (the rest of the small cells except the anchor small cell in a cluster) could be configured with another set of subframes which are different from those configured by the anchor small cell for its sync tracking with the macro-cell, and conduct sync tracking with the anchor small cell on these subframes at which the anchor small cell are supposed to transmit normal subframes or ABS which contains CRS. In the case that small cell uses new carrier type (NCT) which may not transmit CRS, the CSI-RS could be used for sync tracking. In this case, a small cell in a cluster, which is not an anchor small cell, could be configured with MBSFN subframes or other new type of subframes that it does not need to transmit. Such subframes correspond to the subframes that the anchor small cell transmits CSI-RS. The small cell could then use CSI-RS for sync tracking. Alternatively, the zero power (ZP) CSI-RS could be configured in small cells in a cluster other than the anchor small cell, and REs of such ZP CSI-RS corresponds to REs that non zero power (NZP) CSI-RS are transmitted in the anchor small cell. That would allow the other small cells listen to anchor small cell on CSI-RS and use them for sync tracking. For this case, the small cell would need a transceiver would could transmit and receive at the same time.

Third, the macro-cell and small cell may operate on the same frequency (co-channel case) in TDD. In this case, the small cell may not need a separate RF chain for listening to downlink from the macro-cell as both downlink and uplink are transmitted on the same frequency. In this case the small cell and macro-cell may have the same DL/UL configuration so that when the subframe is configured for downlink transmission in the small cell, the small cell may transmit PDCCH in the first several symbols and then listen to the downlink from the macro-cell in the rest of the symbols. The listening operation by the small cell may be transparent to the UE served in small cell, by configuring an MBSFN subframe in the small cell for this purpose. The small cell may transmit PDCCH in the first one or two symbols and then listen to downlink from macro-cell. To reduce interference from other neighbouring small cells that may transmit while the small cell is listening to the macro-cell, some coordination may be need among small cells such that they may listen to the macro-cell at the same subframes. To facilitate the sync tracking for small cell, the macro-cell may transmit a normal subframe (or ABS) with CRS and to achieve this, some coordination may be needed among small cell and macro-cell. If the Macro-cell and the small cell use different TDD DL/UL configuration, the small cell may listen to the Macro-cell for sync tracking in the subframes which are DL subframes for both Macro and small cells.

Fourth, a small cell cluster may not see a macro-cell, for example, in standalone small cell deployment. In this case, one of the small cells may be configured as the timing reference and its sync rank status may be broadcast to other neighbouring small cells. For example, the small cell that equipped with a GPS could claim itself as a timing reference. The sync rank may be used to indicate a cell's timing accuracy, for example, rank=1 may indicate the most accurate timing in a cell cluster and rank=2 may indicate a timing accuracy less than that of rank=1. The neighbouring small cells may listen and try to synchronize with the small cell with the highest timing accuracy (i.e. lowest rank value) and in turn, may also broadcast their sync rank status with an increased rank value. This sync rank information may be indicated in the PBCH and a small cell may need to decode PBCH of the cell which it is listening to. Alternatively, RRC or SIB could be used to convey such information. For Sync tracking purpose, some coordination may be needed to make sure that the all small cells are not listening at the same time because otherwise there is no small cell transmitting at the time and nothing to listen to. For example, the small cell with highest timing accuracy can be configured to transmit while other small cells could be configured to listen.

Fifth, some small cells in a cluster may observe the macro-cell, while others may not. In this case, the small cells which can observe the Macro-cell may first synchronize to the Macro-cell, and then, the synchronized small cells may broadcast their synchronization rank status. Then the other small cells may synchronize to the synchronized small cells and track the sync.

Sixth, if X2 interfaces exist, the small cell may use the proper framing alignment on the backhaul and exchange the timing offset for the radio frames to achieve synchronization.

Figure 24:
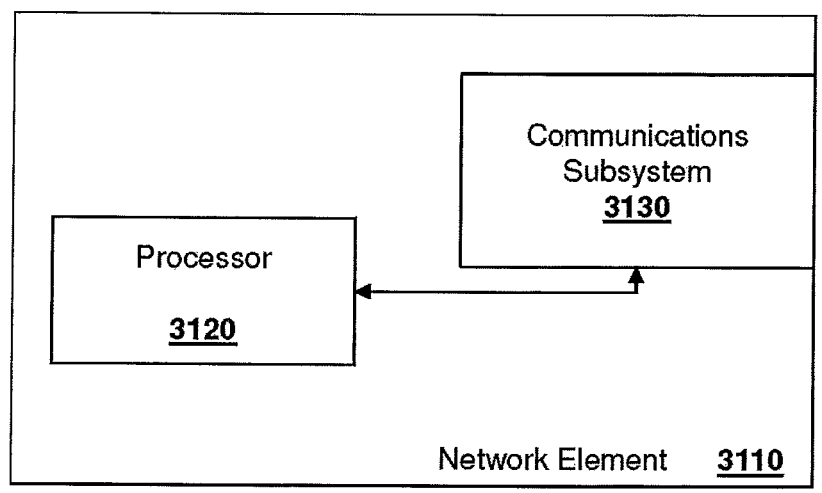
FIG. 24 is a diagram of a simplified network element.

Certain embodiments above may be implemented by a network element. A simplified network element is shown with regard to FIG. 24. In FIG. 24, network element 3110 includes a processor 3120 and a communications subsystem 3130, where the processor 3120 and communications subsystem 3130 cooperate to perform the methods described above.

Further, certain embodiments may be implemented by a UE. One exemplary device is described below with regard to FIG. 25. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Figure 25:
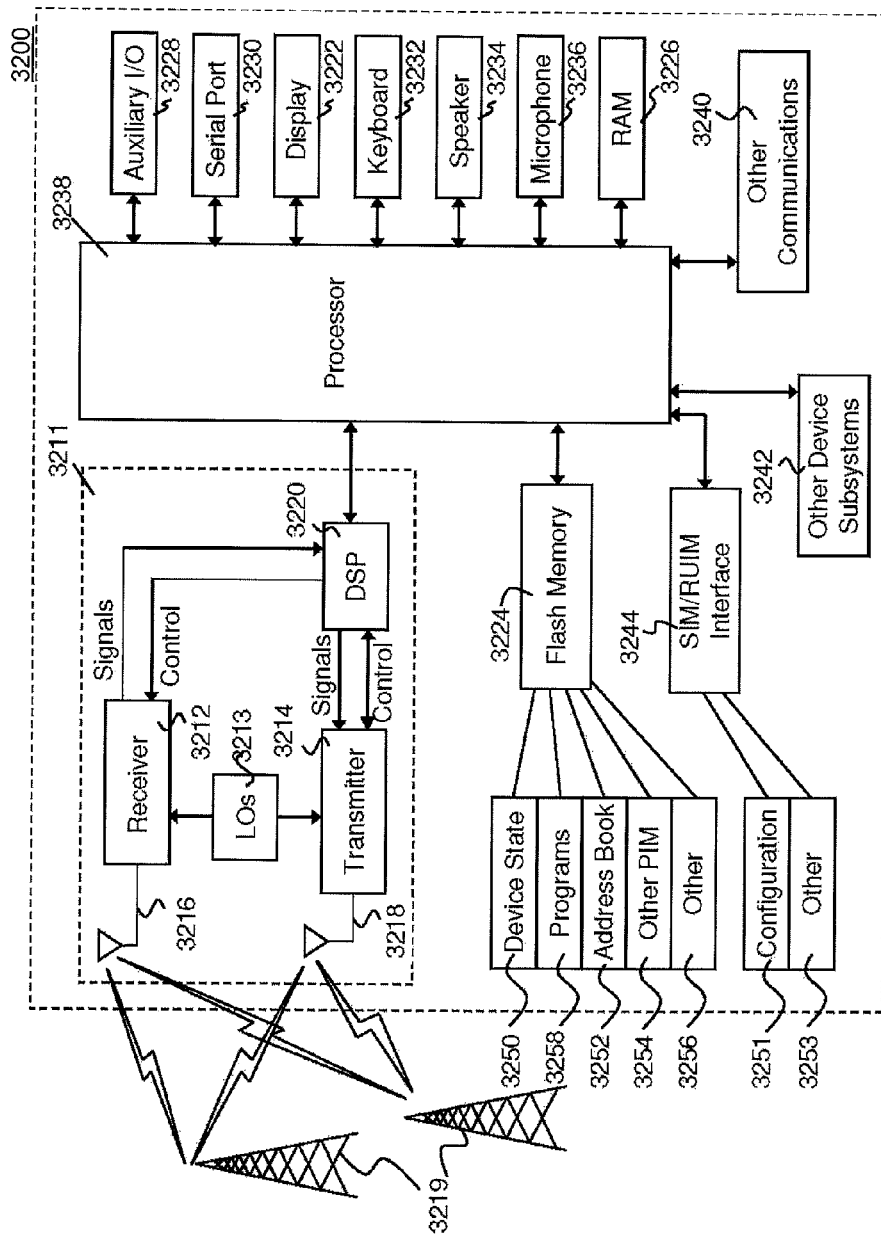
FIG. 25 is a diagram of a user equipment.

Some of the subsystems shown in FIG. 25 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications may be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or Alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 25 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The Alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 26:
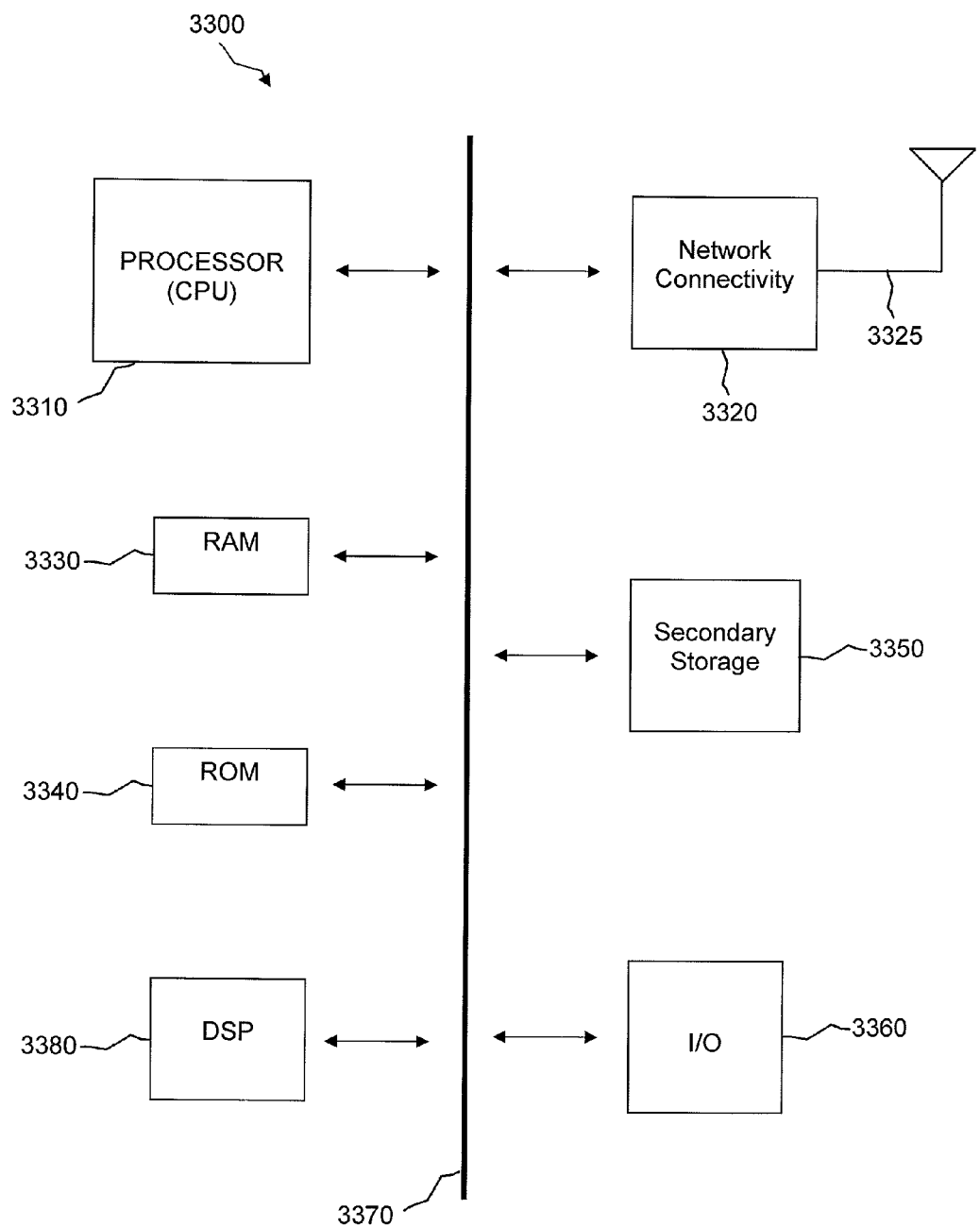
FIG. 26 is a diagram of a processing component.

The UE and other components described above might include a processing component that is capable of executing instructions related to the actions described above. As used herein, the term instructions may include reserved words which cause one or more processors to take certain computational, memory-related or control actions or to send computational, memory-related or control signals. As used herein, the term program may include a collection of computer instructions. FIG. 26 illustrates an example of a system 3300 that includes a processing component 3310 suitable for implementing one or more embodiments disclosed herein. The processing component 3310 may be substantially similar to the processor 3120 of FIG. 24 and/or the processor 3238 of FIG. 25.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips and may be a hardware device capable of executing computer instructions.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and Alterations are ascertainable by one skilled in the art and may be made without departing from the spirit and scope disclosed herein.

What is claimed is:

1. A system comprising:
a first network element in a first cell; and
a second network element in a second cell neighboring the first cell,
the first network element comprising a processor configured to:
assign a first demodulation reference signal (DMRS) pattern for at least one user equipment (UE) serviced by the first network element, wherein the first DMRS pattern is different than a second DMRS pattern used by the second network element in the second cell; and
generate the first DMRS pattern by using a subset of resource elements (REs) used by a DMRS pattern defined for transmission mode (TM) 9.

2. The system of claim 1, wherein the processor is further configured to generate the first DMRS pattern by shifting a location of the REs used by the DMRS pattern defined for TM 9 along a frequency domain, a time domain, or both.

3. The system of claim 1, wherein the processor is further configured to coordinate with the second network element such that the first and second network elements transmit DMRS in resource elements that are orthogonal to one another.

4. The system of claim 1, wherein the first and second DMRS patterns are selected from a plurality of DMRS patterns based on cell identifiers (IDs) corresponding to the first and second cells.

5. The system of claim 1, wherein a first coverage area provided by the first cell overlaps with a second coverage area provided by the second cell.

6. The system of claim 5, wherein the first cell and the second cell are each small cells, and wherein the first cell and the second cell are each configured to provide smaller coverage areas than that provided by a macro cell.

7. A method comprising:
assigning, by a first network element in a first cell, a first demodulation reference signal (DMRS) pattern for at least one user equipment (UE) serviced by the first network element, wherein the first DMRS pattern is different than a second DMRS pattern used by a second network element in a second cell neighboring the first cell; and
generating the first DMRS pattern by using a subset of resource elements (REs) used by a DMRS pattern defined for transmission mode (TM) 9.

8. The method of claim 7, further comprising generating the first DMRS pattern by shifting a location of the REs used by the DMRS pattern defined for TM 9 along at least one of a frequency domain or a time domain.

9. The method of claim 7, further comprising coordinating with a second network element in the second cell such that the first and second network elements transmit DMRS in resource elements that are orthogonal to one another.

10. The method of claim 7, wherein the first and second DMRS patterns are selected from a plurality of DMRS patterns based on cell identifiers (IDs) corresponding to the first and second cells.

11. The method of claim 7, wherein a first coverage area provided by the first cell overlaps with a second coverage area provided by the second cell.

12. The method of claim 11, wherein the first cell and the second cell are each small cells, and wherein the first cell and the second cell are each configured to provide smaller coverage areas than that provided by a macro cell.

13. A first network element in a first cell, the first network element comprising:
a processor configured to assign a first demodulation reference signal (DMRS) pattern for at least one user equipment (UE) serviced by the first network element, wherein the first DMRS pattern is different than a second DMRS pattern used by a second network element in a second cell neighboring the first cell,
wherein the processor is further configured to generate the first DMRS pattern by using a subset of resource elements (REs) used by a DMRS pattern defined for transmission mode (TM) 9.

14. The first network element of claim 13, wherein the processor is further configured to generate the first DMRS pattern by shifting a location of the REs used by the DMRS pattern defined for TM 9 along a frequency domain, a time domain, or both.

15. The first network element of claim 13, wherein the processor is further configured to coordinate with a second network element in the second cell such that the first and second network elements transmit DMRS in resource elements that are orthogonal to one another.

16. The first network element of claim 13, wherein the first and second DMRS patterns are selected from a plurality of DMRS patterns based on cell identifiers (IDs) corresponding to the first and second cells.

17. The first network element of claim 13, wherein a first coverage area provided by the first cell overlaps with a second coverage area provided by the second cell, wherein the first cell and the second cell are each small cells, and wherein the first cell and the second cell are each configured to provide smaller coverage areas than that provided by a macro cell.

* * * * *